US010143127B2

(12) United States Patent
Wilhelmi et al.

(10) Patent No.: US 10,143,127 B2
(45) Date of Patent: Dec. 4, 2018

(54) MULTIPLE AGRICULTURAL PRODUCT APPLICATION METHOD AND SYSTEMS

(71) Applicant: Kinze Manufacturing, Inc., Williamsburg, IA (US)

(72) Inventors: Matthew Wilhelmi, Parnell, IA (US); Dustan Hahn, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 28 days.

(21) Appl. No.: 15/343,342

(22) Filed: Nov. 4, 2016

(65) Prior Publication Data

US 2017/0127604 A1   May 11, 2017

Related U.S. Application Data

(60) Provisional application No. 62/252,168, filed on Nov. 6, 2015.

(51) Int. Cl.
*A01C 7/20* (2006.01)
*A01C 19/02* (2006.01)
(Continued)

(52) U.S. Cl.
CPC .............. *A01C 7/046* (2013.01); *A01C 7/123* (2013.01); *A01C 19/02* (2013.01); *A01C 21/005* (2013.01)

(58) Field of Classification Search
CPC .. A01C 7/04; A01C 19/02; A01C 7/12; A01C 21/005; A01C 7/046
(Continued)

(56) References Cited

U.S. PATENT DOCUMENTS 6,401,638 B1   6/2002 Crabb et al.
6,672,228 B1   1/2004 Groelz et al.
(Continued)

FOREIGN PATENT DOCUMENTS

DE   102013111356 A1   4/2015
EP        2168416 A2 *  3/2010 ............. A01C 7/046
(Continued)

OTHER PUBLICATIONS

Kinze Manufacturing, Inc., PCT/US2016/060458, filed Nov. 4, 2016, "The International Search Report and The Written Opinion of the International Searching Authority or the Declaration" dated Jan. 27, 2017, 14 pages.

*Primary Examiner* — John Weiss
(74) *Attorney, Agent, or Firm* — McKee, Voorhees & Sease, PLC

(57) ABSTRACT

A row unit of an agricultural planter includes a seed meter. The seed meter includes first and second disks within a seed meter housing. The first and second seed disks are positioned in the seed meter housing such that the disks rotate in the same rotation direction and include a common seed release point. A single drive member is operatively connected to both the first and second seed disks such that the drive member selectively rotates one or both of the first or second seed disks at a time. The seed disks may be angularly positioned and conical-shaped member with a central axis and comprising seed cells radially positioned about an outer portion and being substantially non-perpendicular to the central axis. An air pressure source also is included to adhere seed to the disks.

19 Claims, 21 Drawing Sheets

(51) Int. Cl.
*A01C 7/04* (2006.01)
*A01C 7/12* (2006.01)
*A01C 21/00* (2006.01)

(58) Field of Classification Search
USPC ........................................................ 111/185
See application file for complete search history.

(56) References Cited

U.S. PATENT DOCUMENTS

| | | | |
|---|---|---|---|
| 6,834,600 B1 | 12/2004 | Clewell et al. | |
| 7,341,010 B1* | 3/2008 | Friestad | A01C 7/046 |
| | | | 111/185 |
| 9,237,687 B2 | 1/2016 | Sauder et al. | |
| 9,730,379 B2* | 8/2017 | Wendte | A01C 7/082 |
| 2008/0047475 A1 | 2/2008 | Stehling et al. | |
| 2011/0178632 A1 | 7/2011 | Straeter | |
| 2014/0165890 A1 | 6/2014 | Graham | |
| 2015/0237794 A1* | 8/2015 | Sauder | A01O 5/064 |
| | | | 111/174 |
| 2015/0289441 A1* | 10/2015 | Arnett | A01C 7/044 |
| | | | 111/185 |
| 2015/0351315 A1 | 12/2015 | Wendte et al. | |
| 2016/0037713 A1 | 2/2016 | Wendte et al. | |
| 2016/0157416 A1* | 6/2016 | Zumdome | A01C 7/046 |
| | | | 111/185 |
| 2016/0165794 A1* | 6/2016 | Czapka | A01C 21/005 |
| | | | 111/185 |
| 2017/0094893 A1* | 4/2017 | Rains | A01C 7/046 |
| 2017/0311538 A1* | 11/2017 | Wendte | A01C 7/046 |
| 2017/0359952 A1* | 12/2017 | Kinzenbaw | A01C 21/005 |

FOREIGN PATENT DOCUMENTS

| | | | | |
|---|---|---|---|---|
| EP | 3017672 A1 | 5/2016 | | |
| EP | 3050418 A1 | 8/2016 | | |
| WO | WO-2015077743 A1 * | 5/2015 | ........... | A01C 21/005 |

* cited by examiner

MULTIPLE AGRICULTURAL PRODUCT APPLICATION METHOD AND SYSTEMS

CROSS-REFERENCE TO RELATED APPLICATIONS

This application claims priority under 35 U.S.C. § 119 to Provisional Application Ser. No. 62/252,168, filed on Nov. 6, 2015, the contents of which are hereby incorporated by reference in their entirety and for all purposes.

FIELD OF THE INVENTION

The present invention relates generally to the application of agricultural products by use of agricultural implements. More particularly, but not exclusively, the invention relates to methods, systems, and apparatuses for applying at least one of two or more agricultural products to a field by use of an agricultural implement based upon a characteristic of the field.

BACKGROUND OF THE INVENTIONS

An agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disk, and a seed chute. The housing is constructed such that it creates a reservoir to hold a seed pool. The seed disk resides within the housing and rotates about a generally horizontal central axis. As the seed disk rotates, it passes through the seed pool where it picks up individual seeds. The seeds are subsequently dispensed into the seed chute where they drop into the seed furrow.

There have been many ways in which the seed planting process has been adapted in order to increase the amount of yield per acre. For example, instead of treating an entire farm as the same throughout and planting a single type of seed or seed hybrid, there has been a push for planting multiple types of seed to account for differences in soil characteristics, such as moisture content and nutrient level, as well as climate variances. The seed hybrid is selected to provide for the highest yield according to the different conditions throughout the farms. In addition, the hybrids may be configured to treat pest resistance to certain traits found in some, but not all, hybrids.

Therefore, there is a need in the art for an agricultural planter that allows for a user to plant different seed hybrids or varieties in locations of a field based upon known field characteristics in an on-the-go manner. There is also a need in the art for a planter to allow for a larger number of seed varieties to be planted based upon the field characteristics and with a more accurate location than has been heretofore accomplished.

BRIEF SUMMARY OF THE INVENTION

Thus, it is a principle object, feature, and/or advantage of the present invention to overcome deficiencies in the art.

It is another object, feature, and/or advantage of the present invention to provide an agricultural implement that allows the planting of a plurality of seed varieties to be accurately planted at field locations based upon known field characteristics.

It is yet another object, feature, and/or advantage of the present invention to provide an agricultural implement for planting a field that provides for on-the-go selection and planting of a number of seed hybrids or varieties.

It is still another object, feature, and/or advantage of the present invention to provide an agricultural implement that includes a system that allows for planting different seed varieties or hybrids within seconds and/or inches of travel.

It is a further object, feature, and/or advantage of the present invention to provide systems to provide different seed varieties or hybrids to the seed meters at each row unit.

It is yet a further object, feature, and/or advantage of the present invention to provide a seed delivery system for an agricultural system that automatically provides at least one of a variety of seed to a row unit based upon the location of the row unit in a field.

These and/or other objects, features, and advantages of the present invention will be apparent to those skilled in the art. The present invention is not to be limited to or by these objects, features and advantages. No single embodiment need provide each and every object, feature, or advantage.

According to some aspects of the disclosure, a row unit for use with an agricultural planting implement includes a seed meter comprising a seed meter housing, and a first seed disk and a second seed disk positioned in the seed meter housing such that the disks rotate in the same rotation direction and include a common seed release point. A single drive member is operatively connected to both the first and second seed disks such that the drive member selectively rotates one or both of the first or second seed disks at a time.

According to additional aspects of the disclosure, a seed meter is provided, and includes a seed meter housing and a first seed disk and a second seed disk positioned in the seed meter housing such that the disks rotate in the same rotation direction and include a common seed release point. The first and second disks each comprise a conical-shaped member with a central axis and comprising seed cells radially positioned about an outer portion and being substantially non-perpendicular to the central axis. A single drive member is operatively connected to both the first and second seed disks such that the drive member selectively rotates one or both of the first or second seed disks at a time.

According to still further aspects of the disclosure, a method of planting at least one seed type with a seed meter for use with an agricultural planter includes providing a seed meter comprising a seed meter housing, a first seed disk and a second seed disk positioned in the seed meter housing such that the disks rotate in the same rotational direction and include a common seed release point, and a single drive member operatively connected to both the first and second seed disks such that the drive member selectively rotates one or both of the first or second seed disks at a time, providing the at least one seed type to the first and second seed disks, and operating the drive member to rotate at least one of the first or second seed disks to plant seed associated with the disk. The first and second disks each comprise a conical-shaped member with a central axis and comprising seed cells radially positioned about an outer portion and being substantially non-perpendicular to the central axis.

Figure 1:
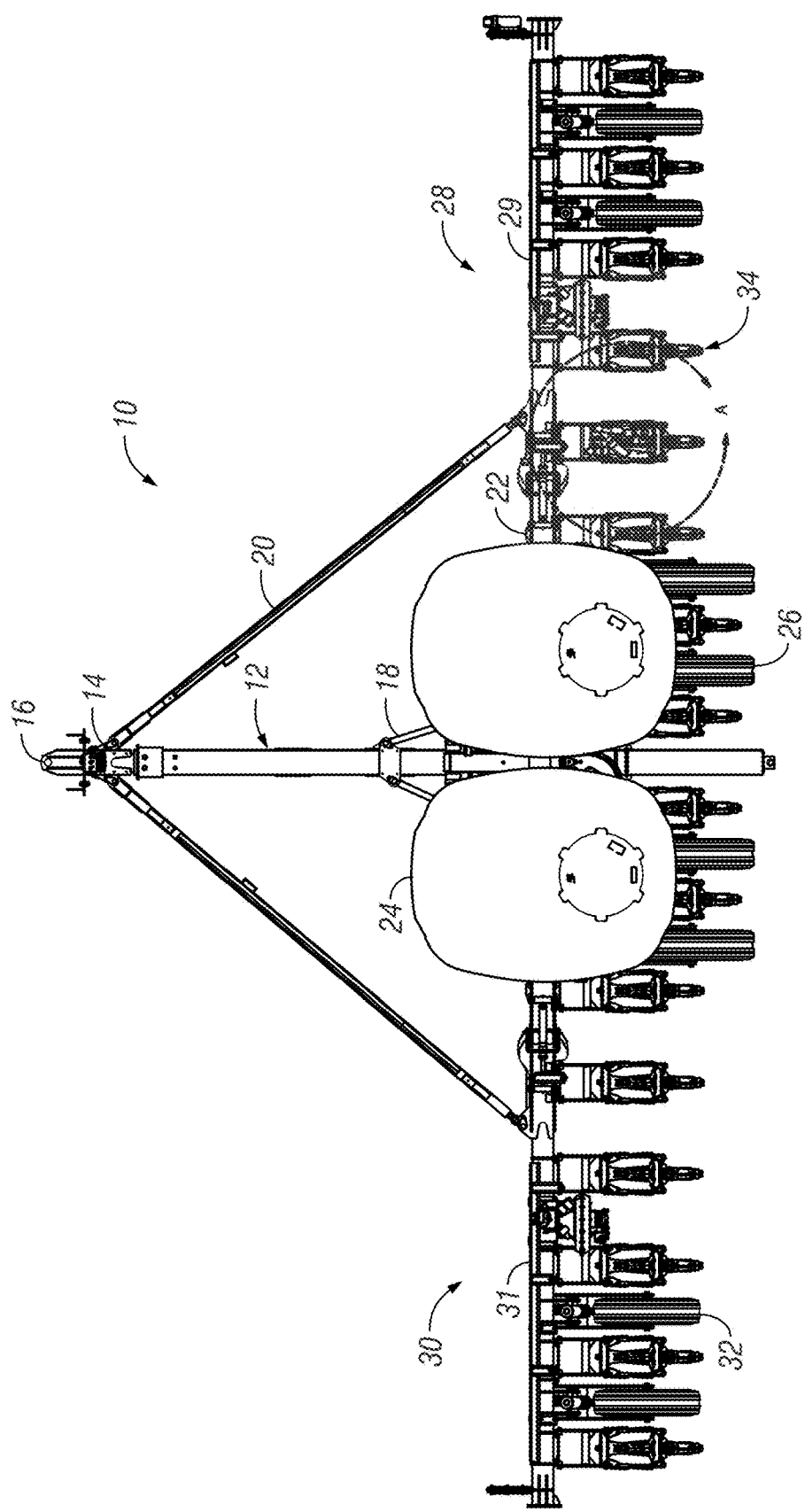
FIG. 1 is a top view of a planting implement.
Figure 2:
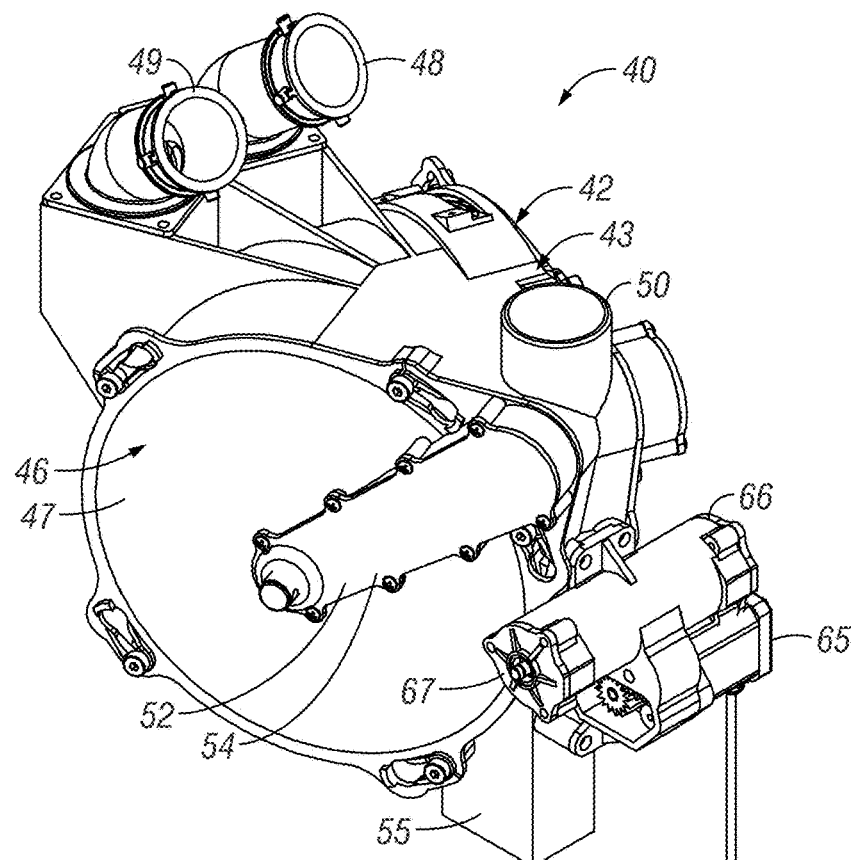
FIG. 2 is a front perspective view of a seed meter according to aspects of the present disclosure.
Figure 3:
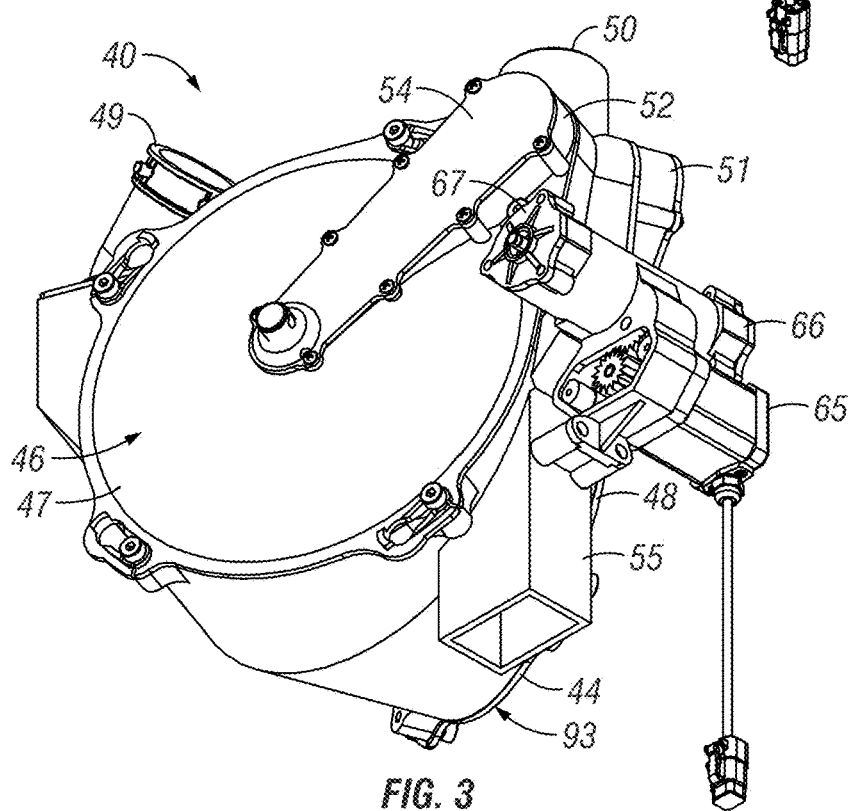
FIG. 3 is a bottom perspective view of the seed meter of FIG. 2.
Figure 4:
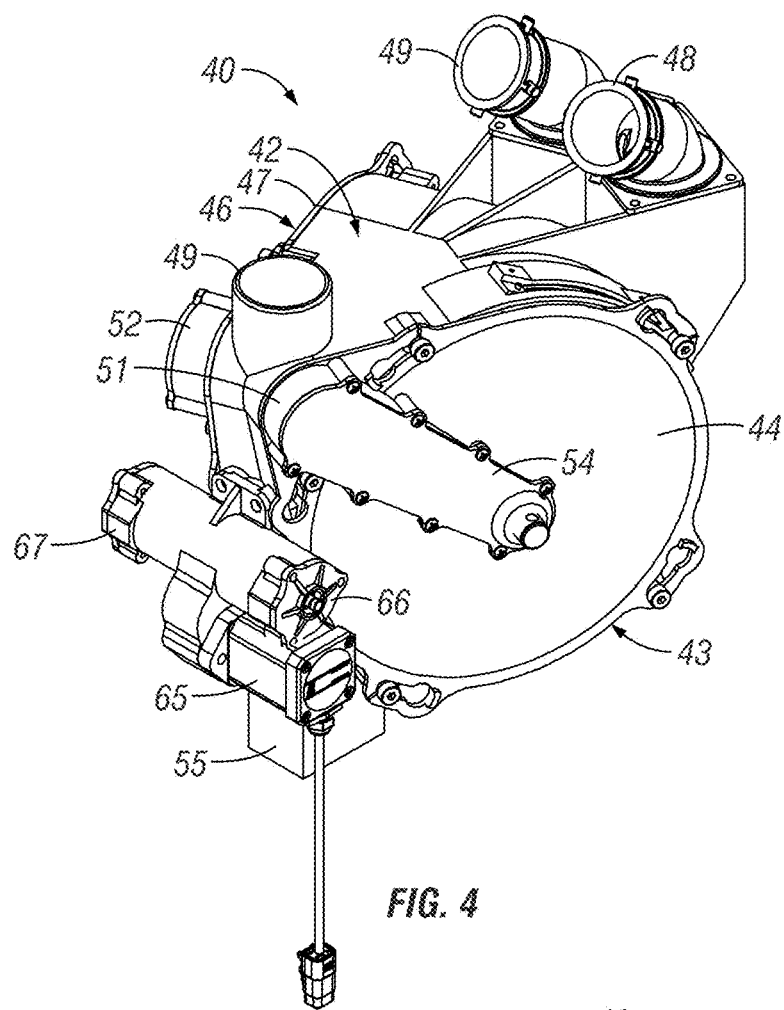
FIG. 4 is another perspective view of the seed meter of FIG. 2.
Figure 5:
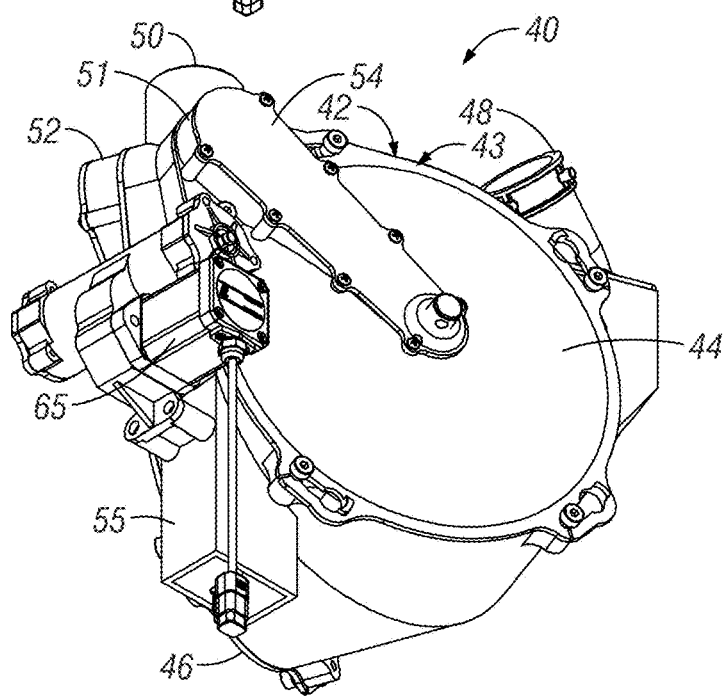
FIG. 5 is another bottom perspective view of the seed meter of FIG. 2.
Figure 6:
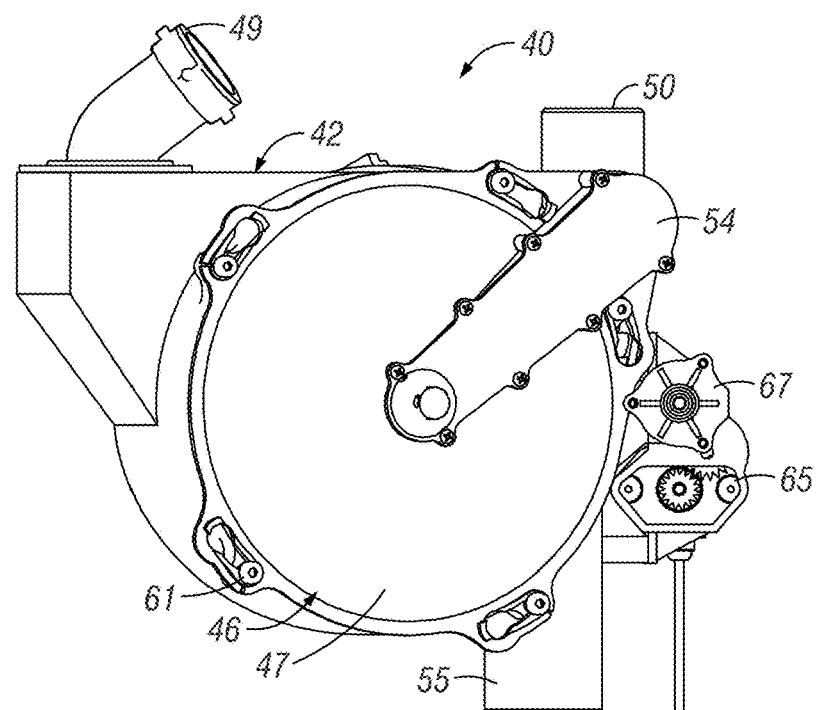
FIG. 6 is a left side elevation view of the seed meter of FIG. 2.
Figure 7:
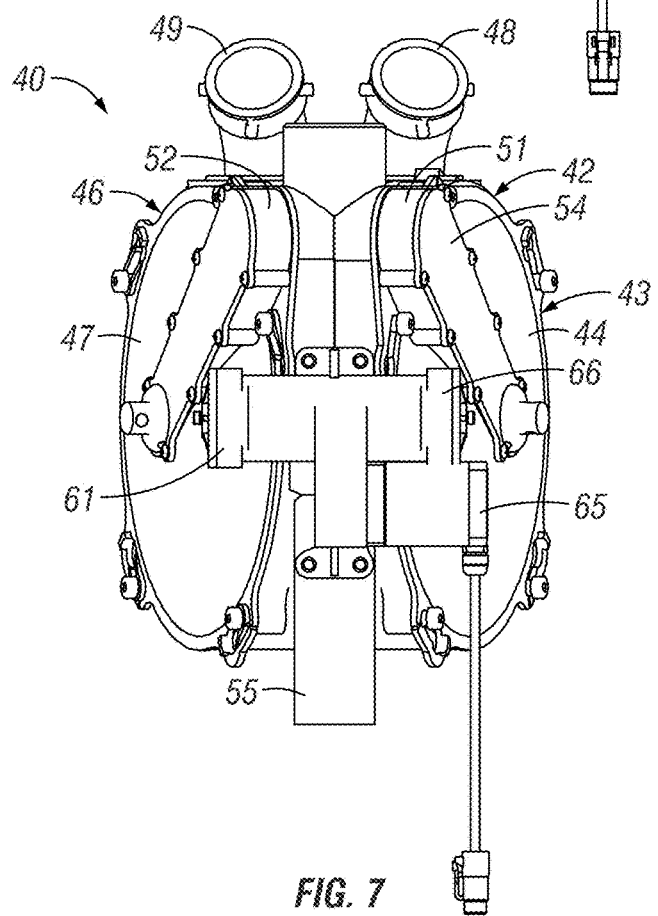
FIGS. 7 and 8 are front elevation views of the seed meter of FIG. 2.
Figure 8:
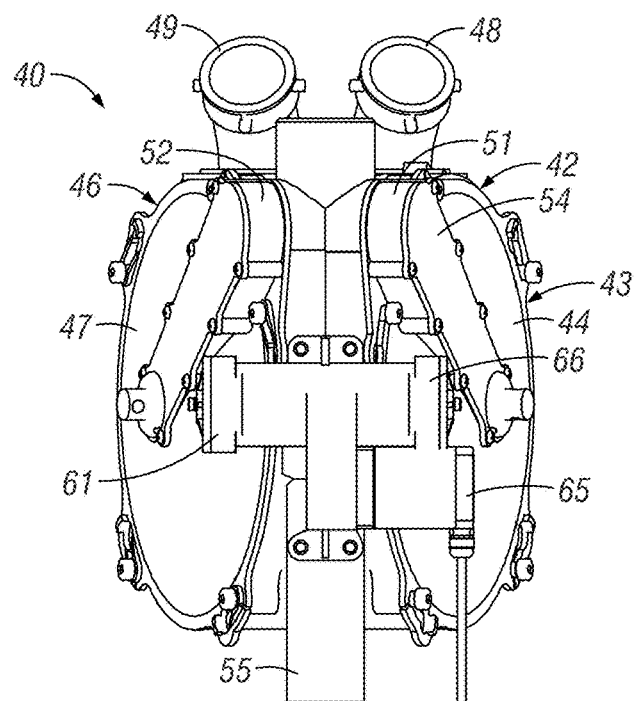
Figure 9:
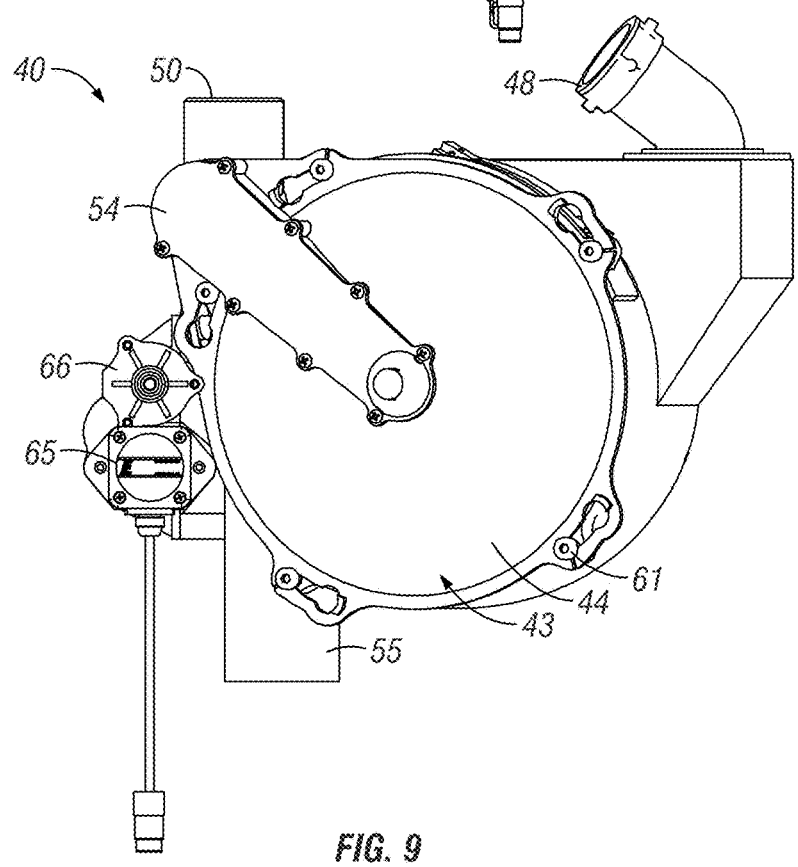
FIG. 9 is a right side elevation view of the seed meter of FIG. 2.
Figure 10:
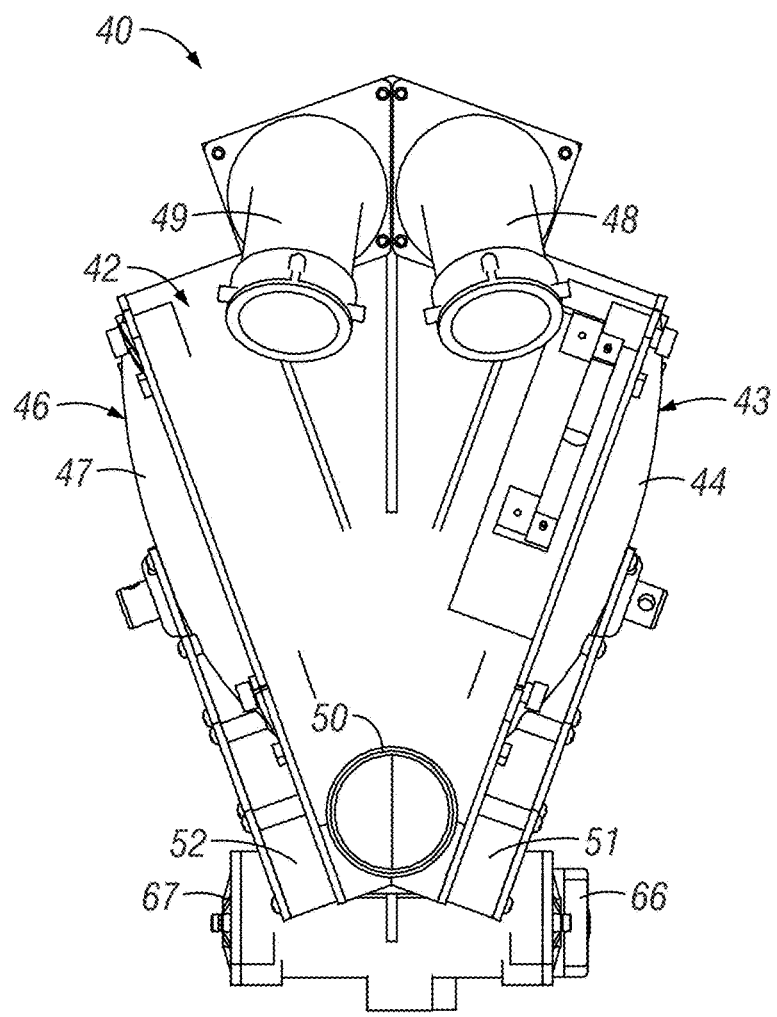
FIG. 10 is a top plan view of the seed meter of FIG. 2.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

FIG. 1 is a top view of an agricultural planter 10. An example of a planter that may be utilized with the various aspects of the invention is further shown and described in U.S. patent application Ser. No. 13/927,177, which is hereby incorporated in its entirety. The planter 10 of FIG. 1 includes a tongue 12, which may be a telescoping tongue such that the planter is a front or rear folding planter. However, the exact nature of the planter is not to be limiting to the invention. The tongue 12 includes a first end 14 in an opposite second end. The first end 14 includes a hitch 16 for connecting the planter 10 to a tractor (not shown) or other vehicle for pulling the planter 10 through a field and for transporting the planter to different locations. The planter 10 shown in FIG. 1 is a front folding planter with telescoping tongue 12 and a pair of draft links 20 extending between a first wing 28 and the tongue 12, as well as from the second wing 30 to the tongue 12. The draft links 20 connect the wings to the tongue such that when the wings fold towards one another by operation of cylinders 18, the draft links 20 will extend the telescoping tongue 12 to lengthen the tongue so that the wing sections 28, 30 are able to be folded generally adjacent one another.

Opposite the hitch 16 of the tongue 12 is a main or central frame 22. The main frame 22 extends generally perpendicular to the tongue 12. The frame 22, which also may be known as a toolbar, can include a housing or support for a plurality of central tanks or hoppers 24. The hoppers 24, which may also be known as bulk fill hoppers, house material, such as seed, insecticide, fertilizer, or the like, which is distributed through a system to individual row units. For example, the bulk fill hoppers can be operatively connected to an air seed delivery system for delivering seed from the hoppers to seed meters of individual row units along the frame and wings. Such an air seed delivery system is disclosed in U.S. Pat. No. 8,448,585, which is hereby incorporated in its entirety. The central frame or toolbar also includes a plurality of row units extending therefrom for distributing the material to the field. In other words, the row units plant the seed or otherwise provide the material to the field. A plurality of transport wheels 26 extend from the main frame and are used to transport the planter in and to or from the field. The transport wheels 26 also support the planter.

Extending generally from opposite sides of the main frame is first and second wings 28, 30. The first wing includes a first frame or toolbar 29, while the second wing 30 includes a second frame or toolbar 31. Extending from the frames is a plurality of row units 34. Such row units will be further described with regard to the figures. A plurality of wing wheels 32 are also included and extend from the wings to aid in maneuvering the planter. The number of row units used with the implement may vary depending on the size of the implement, the requirements of a field, the type of material being distributed to the field, and the like. The number of row units of a planter is not to be limiting to the invention, and the invention contemplates any number of row units for use with a planter.

Furthermore, it should be appreciated that, while a plurality of central tanks 24 are shown, any number may be included or else a single tank with multiple sections to separate different types of material may also be included and contemplated by the invention. According to some aspects of the invention, the number of tanks corresponds to the number of different seed types, varieties, and/or hybrids that are to be planted by the planter. Furthermore, it is also contemplated that the individual row units include row unit hoppers to provide the material at the row units themselves. In such a situation, the air seed delivery will not be required for the seed varieties stored in the row unit hoppers and not in the bulk tanks. Again, the number of hoppers at the row units can correspond to the number of different seed types, varieties, and/or hybrids that are to be planted by the planter. In addition, the hoppers at the row units could have multiple divisions to hold the varieties of seed therein.

As will be understood, the invention provides numerous methods, systems, assemblies, and the like for providing a planter 10 that is able to plant one of a plurality of seed varieties, types, hybrids, or the like, through a field without having to change the planter or material in the storage. As more information is obtained as to particular types, varieties, and/or hybrids, of seeds being able to plant in different conditions, it may be ideal to plant a particular seed hybrid at a known location in a field based on said conditions. For example, a part of a field that does not receive as much water, such as by rain, may require a seed that is able to grow with less water. However, that same seed may not be ideal for planting at the location in the field that does receive more water. Therefore, for some fields, it may be ideal for two different hybrid or seed types to be planted based upon its known information as to field conditions. Planting seed based upon known field conditions and other information will allow a farmer to obtain the highest yield for their crop, which will provide numerous benefits, advantages, and the like.

The planters and components thereof according to the invention will provide for on-the-go changing of seed hybrids in population. The change in seed hybrid being planted may be conducted within a single seed drop, such that there is substantially no gap or overlap when switching from one seed variety or hybrid to another. Such a planter will allow farmers to maximize yield in every part of their field without having to compromise a particular area based on the conditions. For example, in parts of the field with high productivity soil, a "racehorse" or high yield potential seed variety can be utilized, whereas a "workhorse" type seed variety can be used in less productive areas. In fields with poor drainage, a variety that can handle moisture can be planted in the lower areas, where the more productive variety used in field locations of the higher elevation. The various aspects of the invention will allow for farmers to make such on-the-go changing and will provide the opportunity to achieve the highest possible yield. However, while some aspects of the invention disclose the possibility of switching between two seed types, varieties, and/or hybrids, it should also be appreciated that the inventions are not limited to only two. It is contemplated that any plurality of seed types can be hypothetically planted using the concepts herein disclosed, and the invention is not to be limited to the specific aspects.

FIGS. 2-10 disclose in general a seed meter 40 according to various aspects and/or embodiments of the disclosure. As will be understood, the seed meter 40 can be disclosed at each of the row units 34 of a planter 10. For example, one row unit that could be utilized is shown and described in U.S. patent application Ser. No. 14/478,222, filed Sep. 5, 2014, which is hereby incorporated by reference in its entirety. Furthermore, it should be appreciated that more than one of the seed meters 40 that is shown in as will be disclosed can be positioned at a single row unit to increase the number of seed hybrids and/or varieties to be planted at each row unit. However, the seed meter 40 will allow the planting of one and multiple types of seed varieties that may be stored in one of the bulk hoppers 24 of the planting implement 10.

The seed meter 40 allows for the inclusion of multiple seed disks housed within a seed meter housing 42 at a row unit 34. The seed meter 40 according to the present disclosure allows for the use of multiple disks to plant multiple types and/or varieties of seed at the row units as the planter moves through the field, such as to allow for seeds to be planted according to known or obtained data, such as soil type, weather data, elevation, sun exposure, rain exposure, environmental data, and other elements that could affect the growing of a particular type of seed. For example, as some seeds are able to grow in dryer conditions, they may be planted only in locations of a field where less rain is obtained. However, in other areas of a field that may be exposed to greater amounts of rain or pooling of water, a different type of seed could be planted to accommodate such amounts of water. Therefore, the seed meter 40 of the present disclosure allows for the different types of seed to be planted on an on the fly manner according to a seed prescription map or other determination system as the planter is moving through a field.

Therefore, the seed meter 40 as shown in FIGS. 2-10 includes a meter housing 42. The meter housing includes a middle section 45. A first side of the housing 43 is enclosed by a first cover 44. Likewise, a second side 46 is enclosed by a second cover 47. As will be understood, the middle section 45 of the seed meter housing 42 may include a divider wall 56 with flanges extending outwardly therefrom to form openings. The flanges extending outwardly from the divider wall comprise cavities or enclosures to include the first and second seed disks of the meter 40. Therefore, to close the enclosures of the first and second cavities 43, 46, the covers 44, 47 can be attached to the mid-section 45, such as via latches 61. The latches allow for easy attaching and detaching of the covers relative to the middle section. However, it should be appreciated that any type of connection member, including screws, snaps, latches, pins, or the like can be considered to be part of the disclosure.

While the first and second sides are given designation to the seed meter, it should be appreciated that they are for exemplary purposes, and are not to be limiting to the invention. For example, as shown best in FIG. 2, the right side of the figure is considered the front side, while the left side is considered the rear side. The front and rear designations are configured with respect to the direction of travel of the planter. Therefore, the first and second sides could be also known as the left and right sides, but are not to be specifically determinative thereon. Furthermore, as the seed meter is divided into two cavities with the middle divider wall 56 being enclosed by the first and second covers 44, 47, the interior of the meter will have two separate interior sections, which may also be designated as the first interior 43 and the second interior 46. These can be may be known as the first and second interior sections which correspond to the first and second sides of the meter. First and second seed inlet 48, 49 are included to provide seed to be added to the interior sections respectively. For example, seed can be added to the first interior section 43 through the first seed inlet 48, while seed is delivered to the second interior 46 via the second seed inlet 49. The first and second seed inlets may be connected to any type of seed delivery system, such as an air seed delivery system as shown and described in U.S. Pat. No. 8,448,585, issued May 28, 2013, which is hereby incorporated by reference in its entirety. Therefore, such a seed delivery system can allow for the first and second interiors of the seed meter housing 42 to be filled on an as needed basis, due to the make-up and configuration of the seed delivery systems themselves. For example, in some fields, one type of variety of seed may be planted at a higher rate than the other. This may be due to the make-up of the field as well as any other data, such as weather or the like. Therefore, the side of the seed meter requiring additional seed can be filled on an as needed basis, while the second or other side is not being filled due to lack of planting of said seed type. Such a seed delivery system provides for the ability to fill the interiors of the seed meter housing 42 on said as needed basis, without the operator requiring to make any necessary adjustments during planting. The only thing an operator would need to do is refill a bulk fill or other hopper that is providing the seed to the respective sides of the seed meter when it is noted that it is low.

It is contemplated that the seed meter 40, including both sides of the seed meter housing, also including the seed disk therein are of the air seed meter type. For example, such air seed meters can provide a difference in pressure on the opposite sides of a seed disk to allow for seed to be positioned on seed cells of the disks as the seed disks are rotated within the seed meter housing. The seeds attached to the seed cells can be singulated and then once they reach a location within the meter housing where there is no pressure differential, the seed can be released to be directed towards a created furrow in the field for planting. Therefore, the seed meter housing 42 includes an air port 50. The air inlet can be connected to a pressure differential device, such as a positive pressure device or a negative pressure device. Such negative pressure devices may include a vacuum system, while a positive pressure device can include a fan for blowing air into the interior of the meter. The pressure differential device creates a pressure differential within the seed meter housing 42 to attach seeds to the disks. An additional aspect unique to the seed meter 40 includes the ability of a single air port 50 to direct the air to both seed disks in the independent interiors of the seed meter housing 40 to provide for the pressure differential at each of the disks at the same type. This also provides for a constant pressure differential at the seed meters whether they are in use or not. Thus, having the pressure differential acting on each of the meters at the same time on a constant basis will allow for the starting and stopping of a meter to be near instantaneous without having to build up the pressure to provide for positioning a seed at the seed cells due to the pressure differential. While only one disk may be rotating within the seed meter housing 42 at a time, the pressure differential will always be there while the planter is in operation such that when the opposite seed disk is to begin planting, it can begin rotating and seed will automatically attach to or will be already attached at the seed cells to begin the instantaneous change of one seed planting to the other on a seed by seed basis, which can be within inches of one another as the planter moves from the field.

The use of a single air port 50 with the two separate interior cavities of the meter housing 42 is accomplished according to some aspects of the disclosure by the inclusion of a T-shaped channel. The T-shaped channel tees at the port 50 to be separated into a first air channel 51 and a second air channel 52. The first air channel is an arm or section that directs air towards the first interior section 43 of the seed meter housing 42, while the second air arm or channel 52 directs air from the air port 50 towards the interior of the second side 46 of the seed meter housing 42. Additionally, channel covers 54 which are identical to each other for both the first and second sides can be included with the covers 44, 47 to provide for a greater amount of area extending outwardly from the rest of the covers to allow for the air to create the differential required within the interiors of the first side 43 and second side 46 of the air seed meter housing 42.

Furthermore, it should be noted that the air seed meter housing 42 includes such a shape where the front of the housing 42 is narrower than the rear. As will be understood, the seed disks within the housing are oriented in an angularly mirrored way such that a portion at the front of the housing 42 of the seed disk are near each other, while a portion of the disks at the rear of the housing 42 are away from each other. This allows for larger seed pools for the seed to be collected within the interiors of the seed meter housing 42, while also providing for a common seed release point. The common seed release point will be above or near the seed chute 55 extending substantially downward from the seed meter housing 42. The seed chute 55 can be known as a common seed release point because of the fact that both seed disks rotating within the seed meter housing can deposit seed from the seed cells and can drop a seed into the same chute 55 thus negating the requirement of separate seed chutes. Utilizing a common seed chute 55 will allow for common or standard seed delivery systems to receive the seed from the chute and direct them towards a furrow in the ground. Additional advantages obvious to those skilled in the art of having such a common seed chute 55 for receiving seed from both meters regardless of the active disk within the meter is to be considered part of the disclosure.

Still further shown in the figures includes a single drive mechanism, which is shown to be a single electric motor 65. Another unique and/or novel aspect of the disclosure is the use of a single drive mechanism which is shown to be an electric motor 65 in the figures, to drive both of the disks within the meter housing 42. Prior seed meters and/or row units having the ability to plant multiple types of seed have required independent control of each seed disk to begin rotation of a specific disk for planting. However, an aspect of the invention circumvents this and allows for the use of a single motor, which can reduce the cost, the weight, and the amount of area necessary for such a drive mechanism, which is advantageous over that previously known. The use of the single electric motor 65 is accomplished, at least in part, by a use of a clutch system including a first clutch 66 and a second clutch 67. These are shown to be included in a clutch housing within the figures. The motor and clutch are operatively connected to one another and also to a control logic, computing device, or other intelligent control (CPU or otherwise), to allow for the electric motor 65 to engage one of the clutches, which in turn engages the corresponding seed disk for rotation and planting via the seed meter 40. While the one seed disk is rotating, the opposite seed disk can be maintained in an idle situation wherein the clutches disengage from the motor such that the opposite disk will not be rotating within the seed meter housing 42. However, as the pressure differential source is constant for both seed disks regardless of disk in use, once the change in disk is required to change the hybrid and/or variety of seed being planted, the disengaging of a first clutch and engaging of the second clutch will provide for instantaneous planting of seed via the opposite disk. This will be understood in greater detail as will be shown and described below, which also will show how the disks can have some overlapping of rotation, or both be rotating together.

FIGS. 11-14 show exploded views of the seed meter 40 to show additional aspects of the present disclosure. For example, the figures show some of the internal components of the seed meter 40 including internal components of the seed meter housing 42 to show how the components thereof are connected to and in relation to one another.

Figure 14:
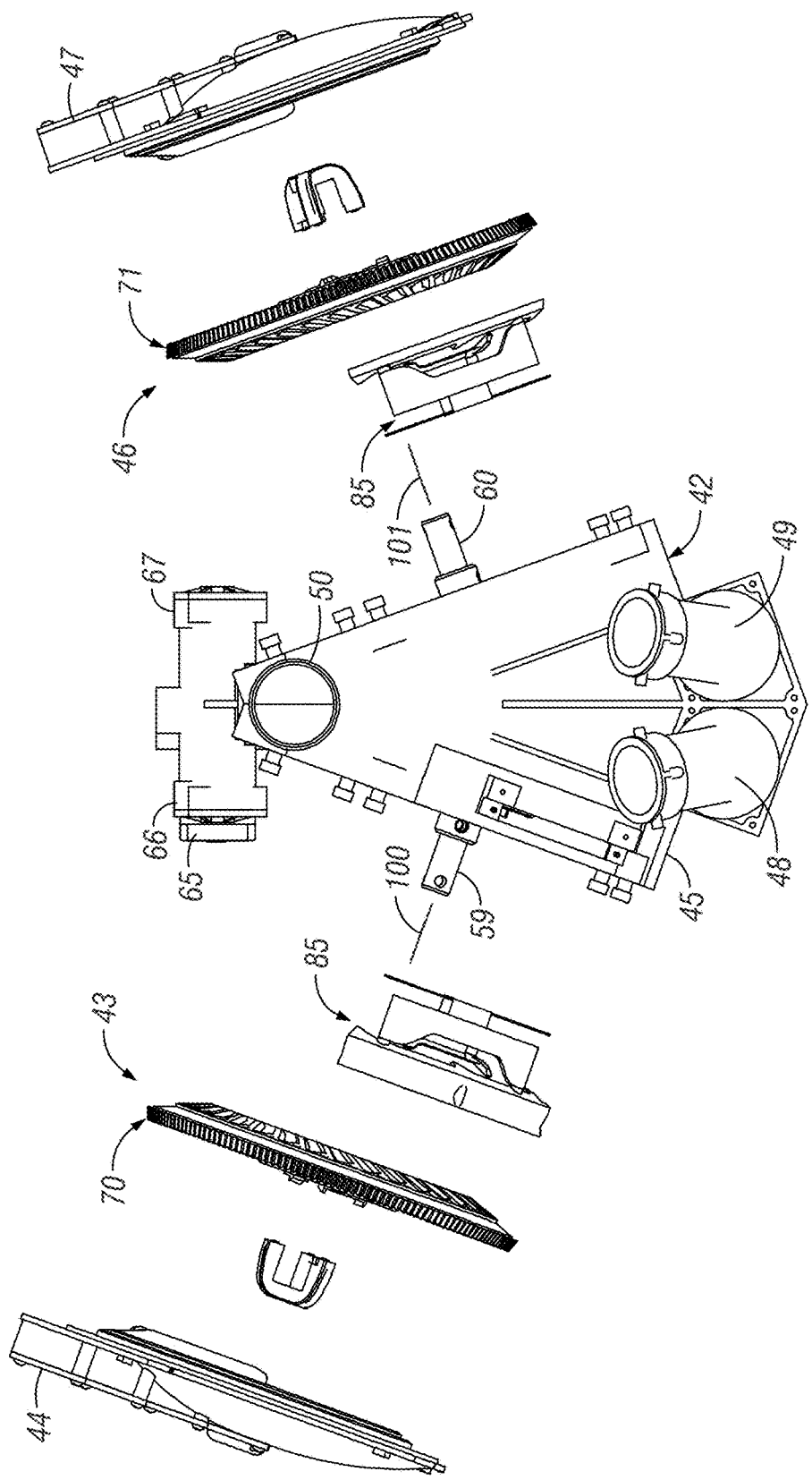
FIG. 14 is an exploded top view of the seed meter of FIG. 2.

The figures show the seed meter housing 42 including the middle section 45. As was previously disclosed, the middle section 45 includes a divider wall 56, which separates the interior cavities of the first side 43 and the second side 46 of the seed meter housing 42. Furthermore, the first side 43 in the cavity formed therein includes a seed pool 62, while the second side 46 includes a portion comprising a second seed pool 63. As mentioned, the seed meter 40 includes seed inlets 48, 49. The seed passing through the inlets 48, 49 collect in the seed pool 62, 63 on the respected sides of the meter divider wall 56. Thus, the different seed types or varieties are separated via the divider wall and are collected until they are ready to be planted via the seed meter 40. Furthermore, as previously disclosed, and shown in FIGS. 12 and 14, the middle section 45 of the seed meter housing 42 is shaped such that the sides of the front portion are narrower and closer to one another than the portions at the sides at the rear portion of the section. For example, as is shown in FIG. 14, and looking from the top of the seed meter housing 42, the middle section 45 comprises generally a triangular shaped member wherein the bottom section of the triangle is arced or otherwise not straight. Such a triangular shaped configuration allows for a greater area for the seed pool 60, 63 at the rear sections of the middle piece 45 of the seed meter housing 42, while also allowing for the disk to be rotated towards one another as they rotate towards the front of the middle section 45 to release seed at the common chute 55, as previously disclosed.

As such, the seed disks 70, 71 are positioned within the first and second interior cavities 43, 46 of the seed meter housing 42 in an angular but mirrored fashion. For example, the disks are mirrored in that a seed side 74 of each of the disks is generally facing one another while the air sides 75 of the disks 70, 71 are positioned facing away from each other. According to some aspects of the disclosure, the disks are angled approximately 40° relative to one another, with a 20° angled bevel on the seed side 74 of the disks to form a generally conical-shape disk. However, it should be appreciated that other angles, including ranges from 20-70° be contemplated between the disks and other corresponding bevel angles also contemplated. Therefore, the disk will rotate in the same rotational direction, which in the figures is a counterclockwise direction to pick up seed in the seed pools at the rear of the middle section rotate through a seed singulator 85 and towards the common seed chute 55. At said common seed chute area 55, the pressure differential is at or near zero, which allows for the seed to be released from the seeds disks and dropped through the seed chute 55 and directed via a seed delivery system or other mechanism towards a furrow created in the ground for planting.

However, as it is also noted, the disks are angularly relative or positioned relative to one another. Again, as is shown in FIG. 14, a first hub and bearing member 59 includes an axis 100 while the second hub and bearing 60 includes a second axis 101. The first and second axes are not in line with one another, and instead form a V-shape wherein the axes when viewed from the front of the seed meter are less than 180 degrees relative to one another. This allows the seed disk to be at the angle to pass via the seed pools to collect the seed and to continue rotation towards one another and towards the common seed chute release point 55. Furthermore, as has been mentioned, first and second bearing members 59, 60 can be included at the axes of the respective seed sides 43, 46 to allow for easier rotation of the seed disk relative to the hubs 73 of the disk and seed meter housing 42.

Figure 11:
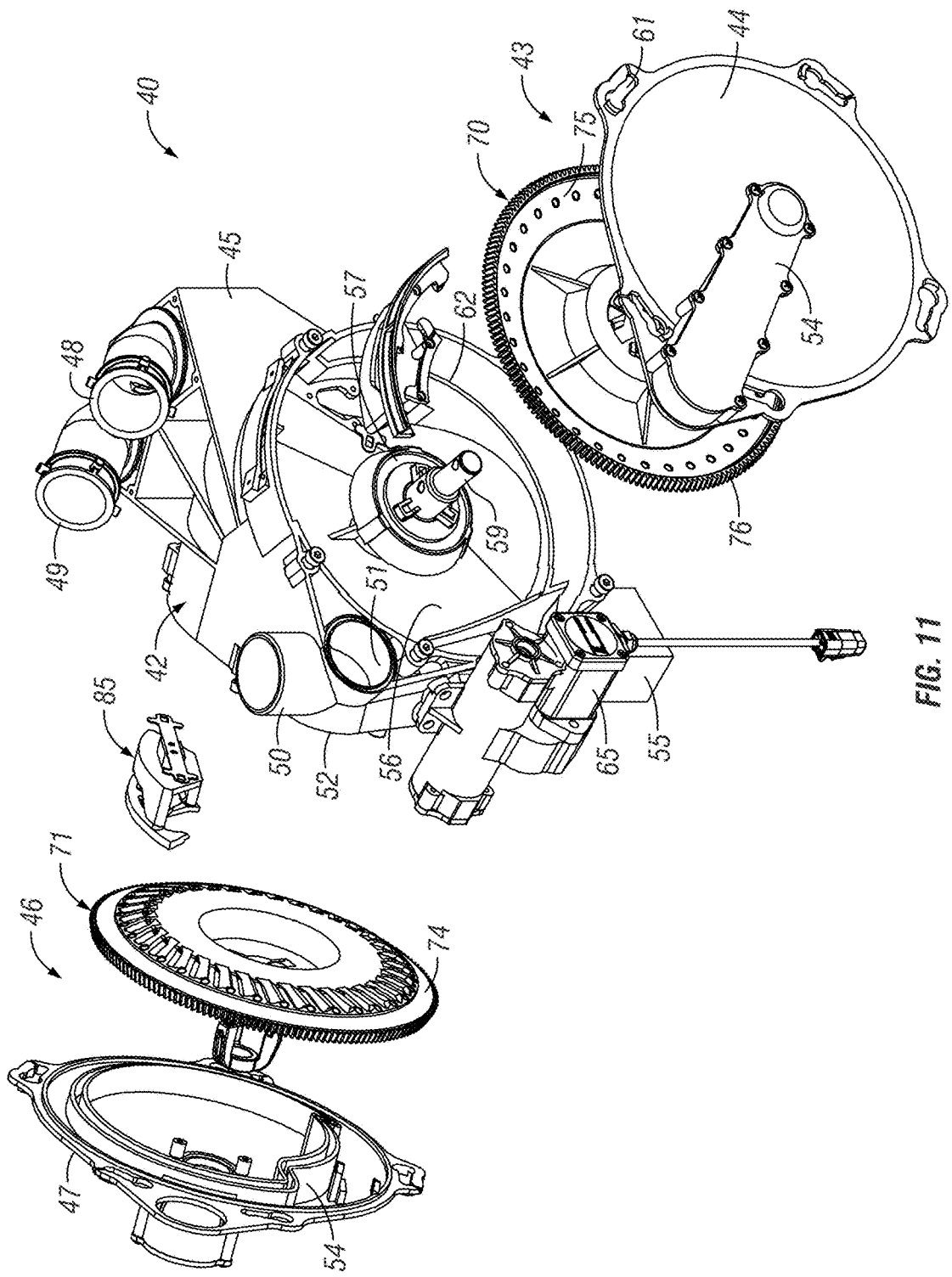
FIG. 11 is an exploded perspective view of the seed meter of FIG. 2.
Figure 12:
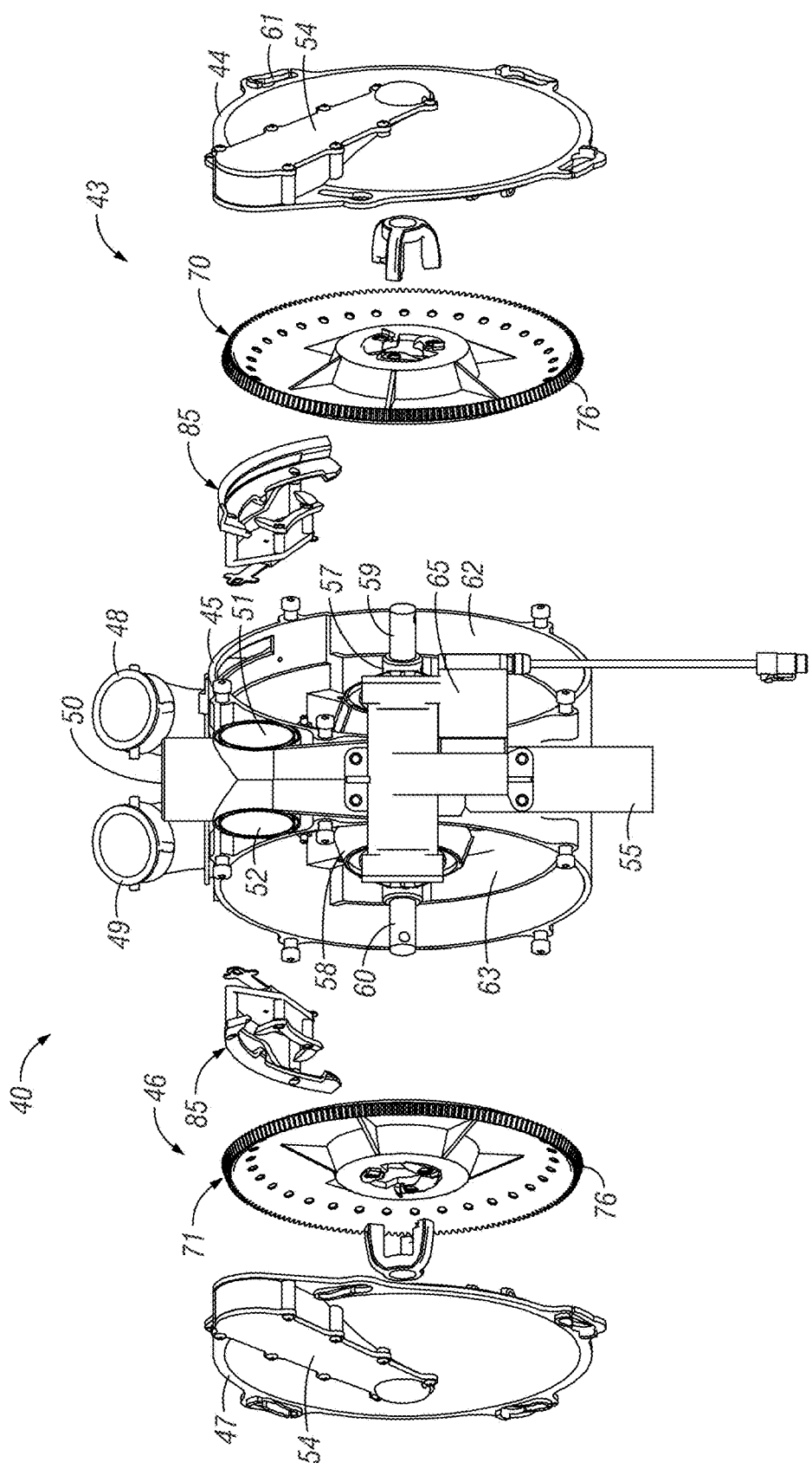
FIG. 12 is an exploded front view of the seed meter of FIG. 2.
Figure 13:
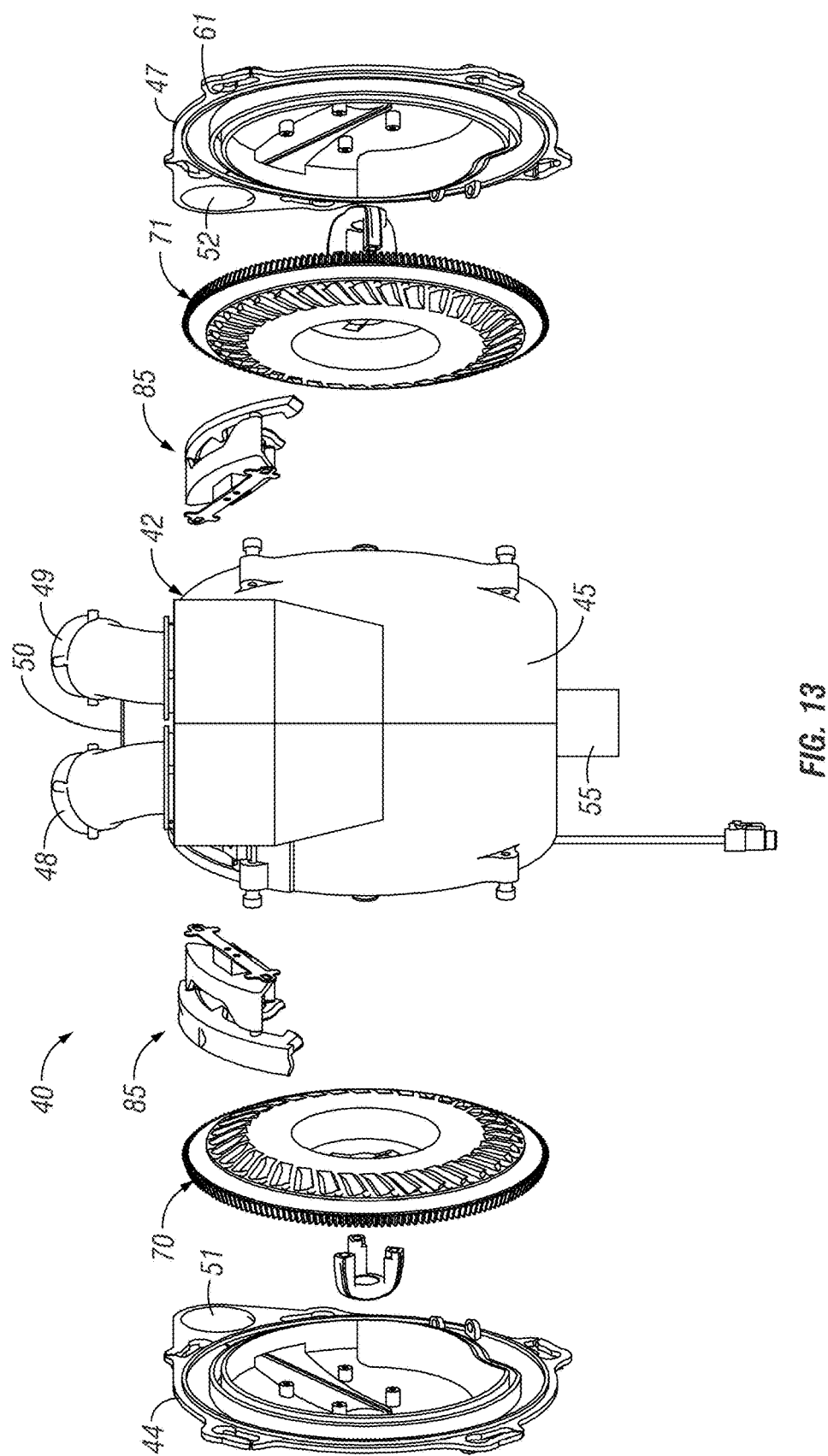
FIG. 13 is an exploded rear view of the seed meter of FIG. 2.

FIG. 11 shows how the first disk 70 and second disk 71 can be relative to one another to allow for the collection and release of the seed via the disk. Furthermore, the figure as well as the additional figures can show how the seed disks 70, 71 are conical in shape. The conical shape of the disks wherein the seed side 74 is the narrower radiused side of the disk allows for the disk to rotate in the angular manner wherein the first and second disks are angled relative to one another to still provide that the seed is released at a position and location where the seed will be dropped vertically at an almost 90-degree vertical angle relative to the direction of travel and not at additional angle. It can be important that seed is delivered in a relative vertical direction or manner relative to the ground. Having a substantially planar seed disk used with the seed meter 40 of the present disclosure would provide that the disk when coming at an angle would be released at an angle relative to the ground and to the seed chute which could cause the seed to bounce about the chute and any seed delivery seed system as it approaches or as it is released toward the ground. However, due to the conical fashion of the seed disk of the present disclosure, when the seed disk approaches or nears the point of release, which is at the point of no pressure differential and generally above the seed chute 55, the seed will be released in a substantially vertical direction relative to the seed chute and the ground which is a generally or substantially vertical direction i.e., 90 degrees relative to the ground. This will give the seed the best chance to fall through the chute and be receiving and/or directed via the seed delivery system in a vertical manner, which should and does reduce the amount of bouncing or movement of the seed as it moves to the furrow. This will aid in providing desired and proper seed spacing between adjacent seeds, which can increase and provide for the highest yield in a field. The seed disks will be described in greater detail below.

Furthermore, as will also be understood, singulators 85 are utilized with the seed meter 40 according to the present disclosure. The seed singulators 85 are connected to the interior cavities of the middle section 45 of the seed meter housing 42. The seed singulators 85 include a substantially non-planar surface 86 with lobes 87 extending therefore. The lobes may be members extending downwardly to correspond with a type of seed. The non-planar surface of the seed singulator 85 is utilized in conjunction with the conical shape of the seed disks of the present disclosure. Common seed singulators are planar as common seed disks have planar faces. Having both surfaces be planar allows for the singulator to ride along or be adjacent the planar seed face to allow for the singulator to singulate the seeds as the disk is rotated within a seed meter. However, as mentioned, the seed discs of the present disclosure are conical to allow for greater flexibility in the rotation while still providing the near or substantial vertical release of the seed. Therefore, a planar singulator would not provide for adequate singulation of the seeds attached to the disk. Thus, the seed singulator 85 includes the non-planar surface 86 which can correspond with the arcuate shape of the seed disk face to allow for the seed disk to move relative to the seed singulator in a manner wherein the seed singulator can still singulate seeds attached to said disk to provide for single seeds at each of the seed cells.

Figure 15A:
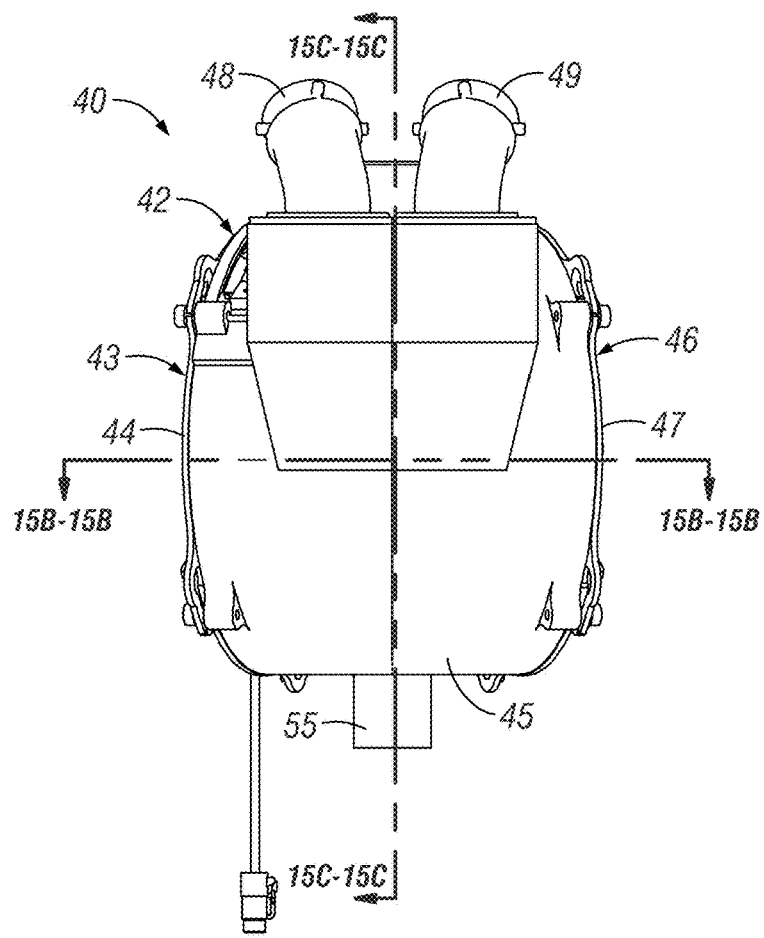
FIGS. 15A-C are rear, top sectional, and side sectional views of the seed meter of FIG. 2.
Figure 15B:
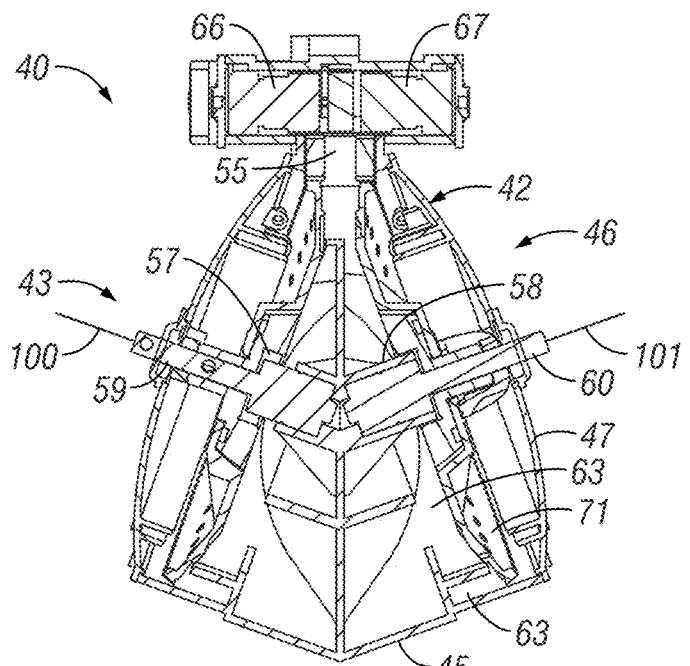
Figure 15C:
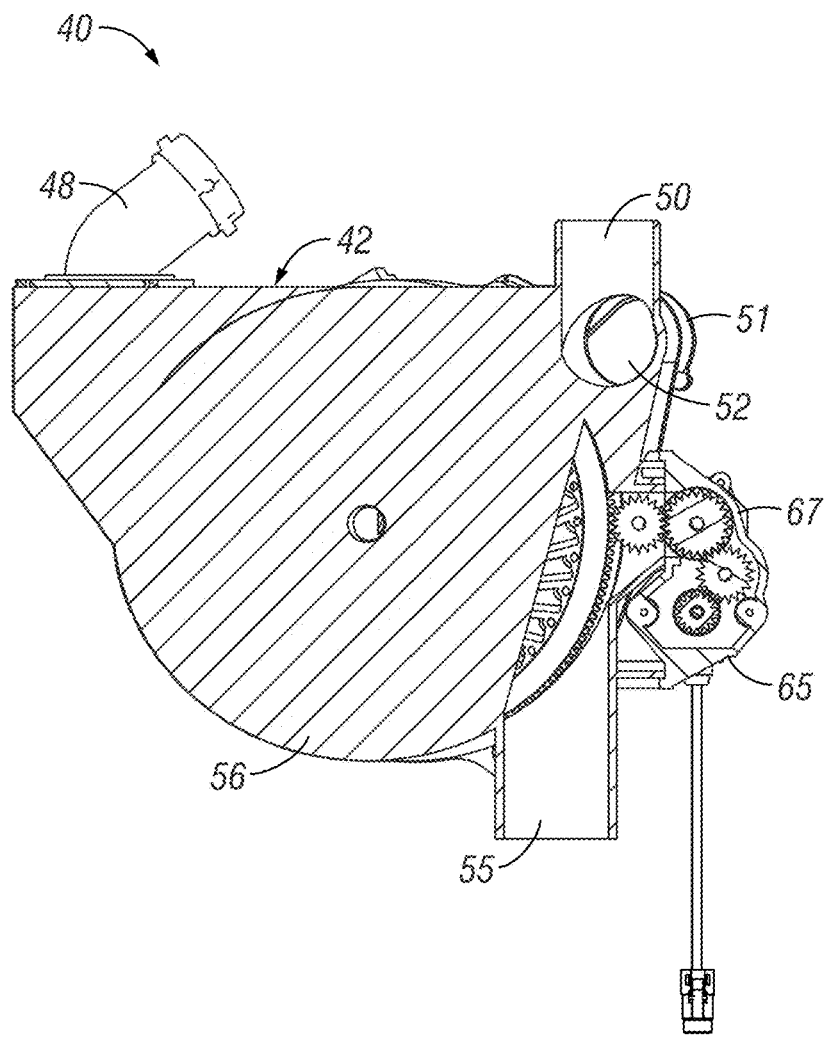
Figure 16:
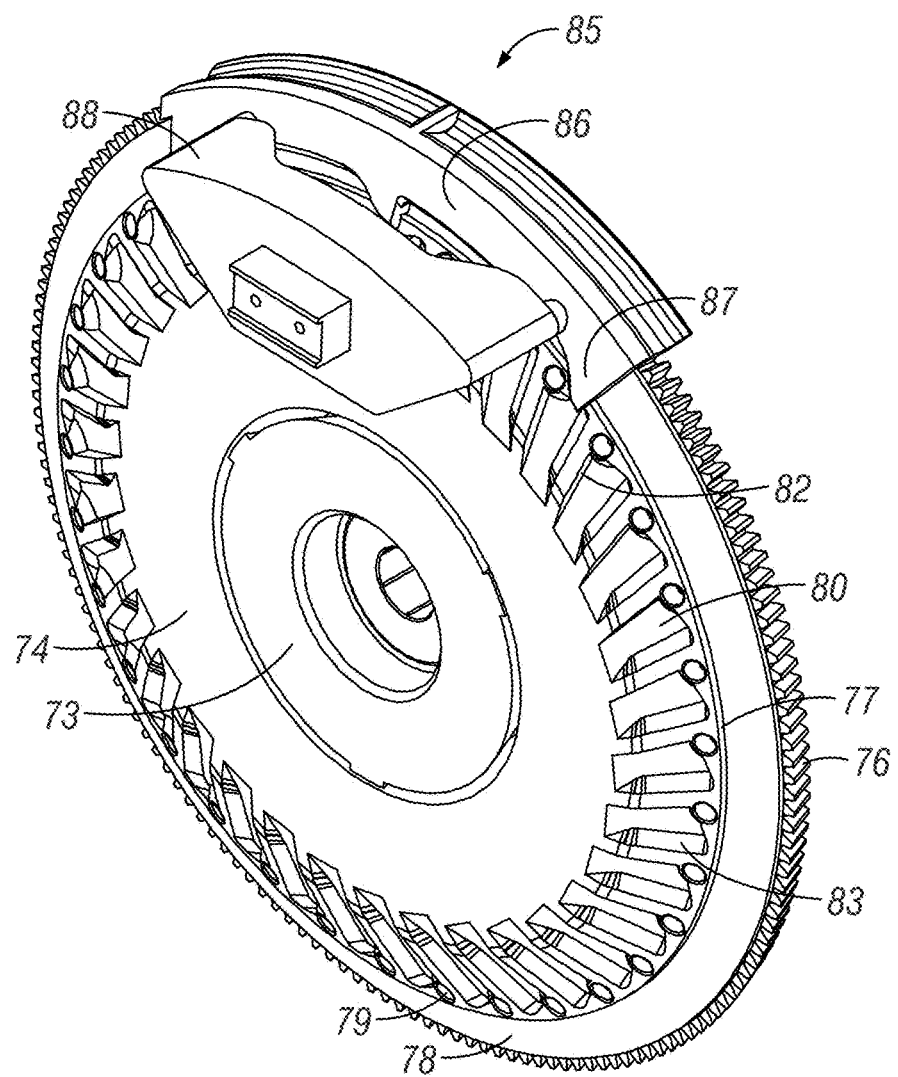
FIG. 16 is a perspective view of a seed disk and singulator according to aspects of the disclosure.

FIGS. 15A-C show a top view and sectional views of the seed meter housing to provide for additional views of the interior of the seed meter housing 42. For example, FIG. 15A is a rear view of the seed meter 40 with components already shown and described provided. FIG. 15B is a sectional view taken along a horizontal line B-B of FIG. 15A. The view in FIG. 15B allows for a better understanding of the components of the seed meter 40 as they may be utilized with the seed meter 40. For example, the FIG. 15B shows in greater details the first and second bearings 57, 58 and their angular relationship to one another. As mentioned, the bearings and thus the seed disk axes 100, 101 are angled in a vee manner when looking at the top of the seed meter 40. Furthermore, the meter divider wall 56 is seen to show how the sides 43, 46 of the meter housing are separated to provide for independence of each of the sides, while still being utilized in a single housing member. The figure shows the inclusion of a first seed pool and second seed pool 62, 63 wherein seed is deposited into the seed meter housing to be picked up by the seeds disks 70, 71 as they are rotated through the seed pools.

For example, as is shown in the figures, the interior faces of the seed disks 70, 71 are the seed side 74 of the disks themselves. The opposite side can be known as the air side 75 wherein the pressure differential is provided via the first and second channels 51, 52 of the air port 50. Thus, as the disks are rotated about the hubs 73 with help of the bearings 59, 60, the disks pass through the seed pools wherein the pressure differential at the location will urge a seed to become lodged at a seed cell of the disk. The seed disk continues rotation through the singulator 85 to insure that only a single seed is positioned at each of the seed cells. Continued rotation is provided until the seed reaches the area adjacent the seed chute 55, which may also be known as the common seed release point. As is shown in FIG. 15B while the seed cells and disk are positioned away from the meter divider wall 56 near the seed pools 62, 63, once they rotate to a location adjacent the common seed release point 55, they will be generally vertical relative to said seed release point 55. This will allow the seed to be deposited at a common point from either of the seed disk, which will allow for the seed to be dropped in a generally vertical manner towards the ground.

Furthermore, 15C shows additional views of the meter divider wall 56, which is blocking a majority of the first side 43 from the second side. The second side has been removed to show the section of the divider wall 56. However, as is shown in FIG. 15C, an area above the seed chute 55 or seed release point, is open. This opening in the seed meter divider wall 56 is through the wall such that both disks will be open at the location. This provides for the seed to be released at the common point to have the seed be released through the chute 55 from either of the disks. Furthermore, FIG. 15C shows an interior portion of the motor 65 and a portion of the first clutch 67, which will be disclosed and explained in greater detail below.

Figure 17:
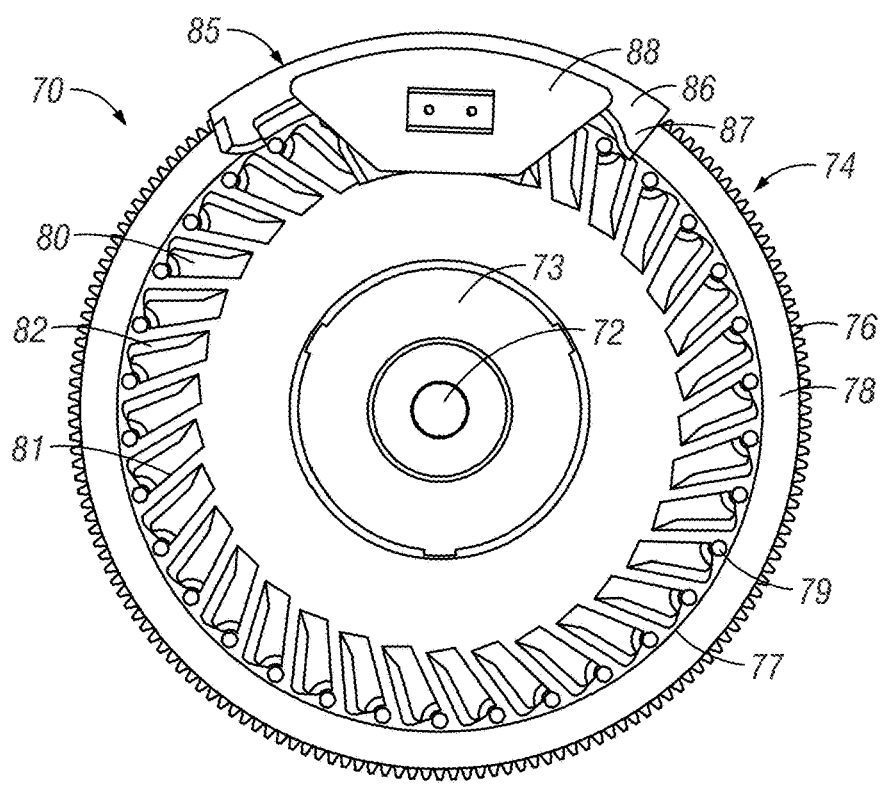
FIG. 17 is a view of a seed side of a seed disk according to aspects of the disclosure.
Figure 18:
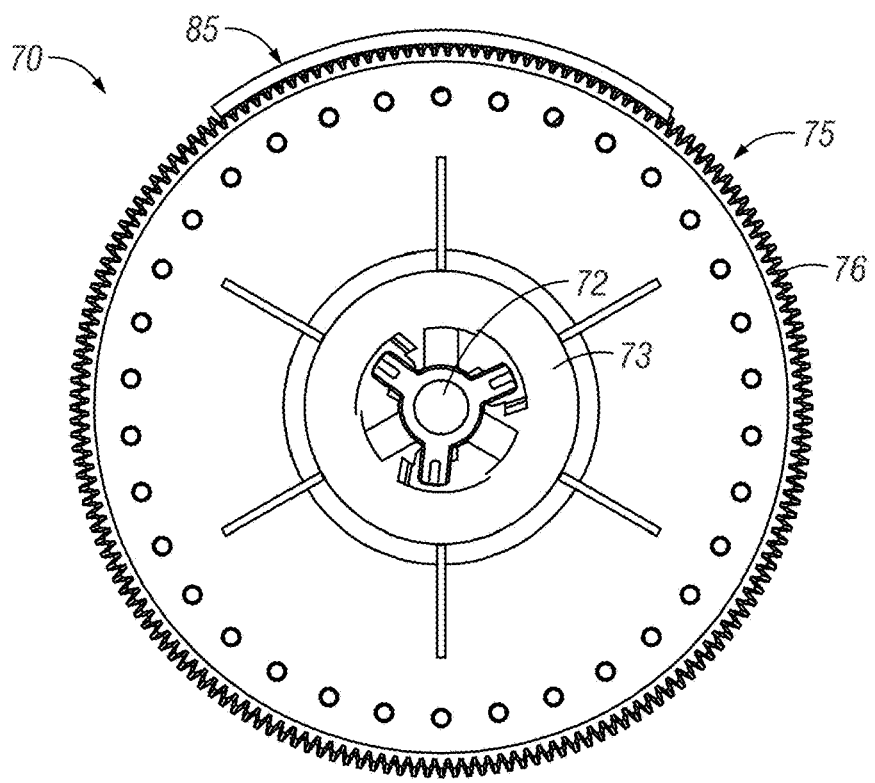
FIG. 18 is a view of an air side of a seed disk according to aspects of the disclosure.
Figure 19:
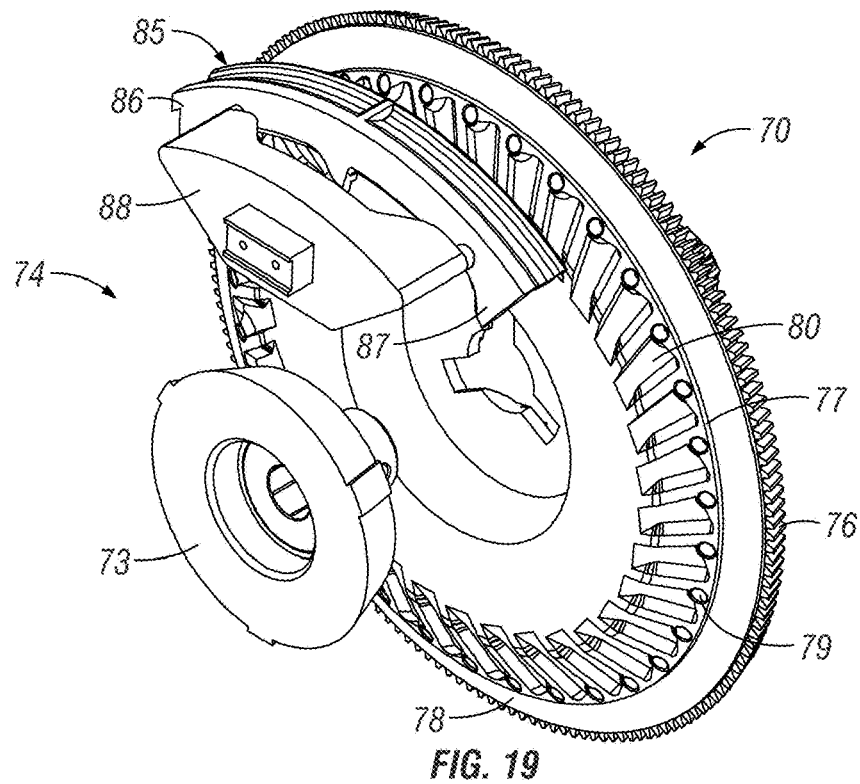
FIG. 19 is an exploded view of the seed disk and singulator.
Figure 20:
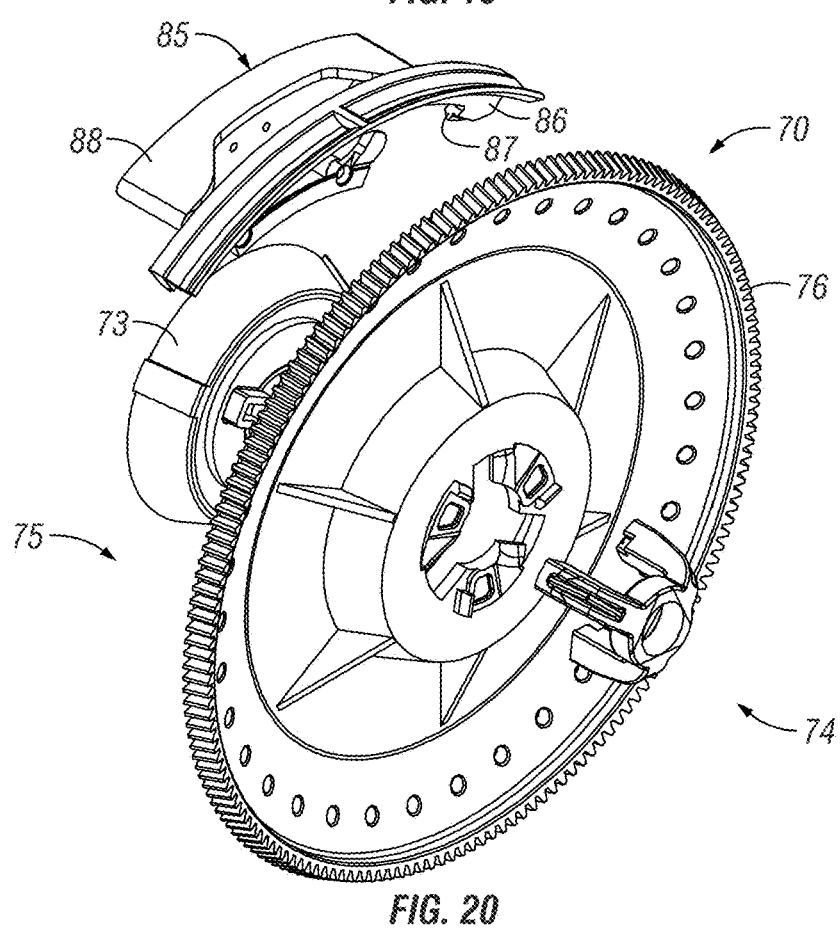
FIG. 20 is another exploded view of the seed disk and singulator.
Figure 21:
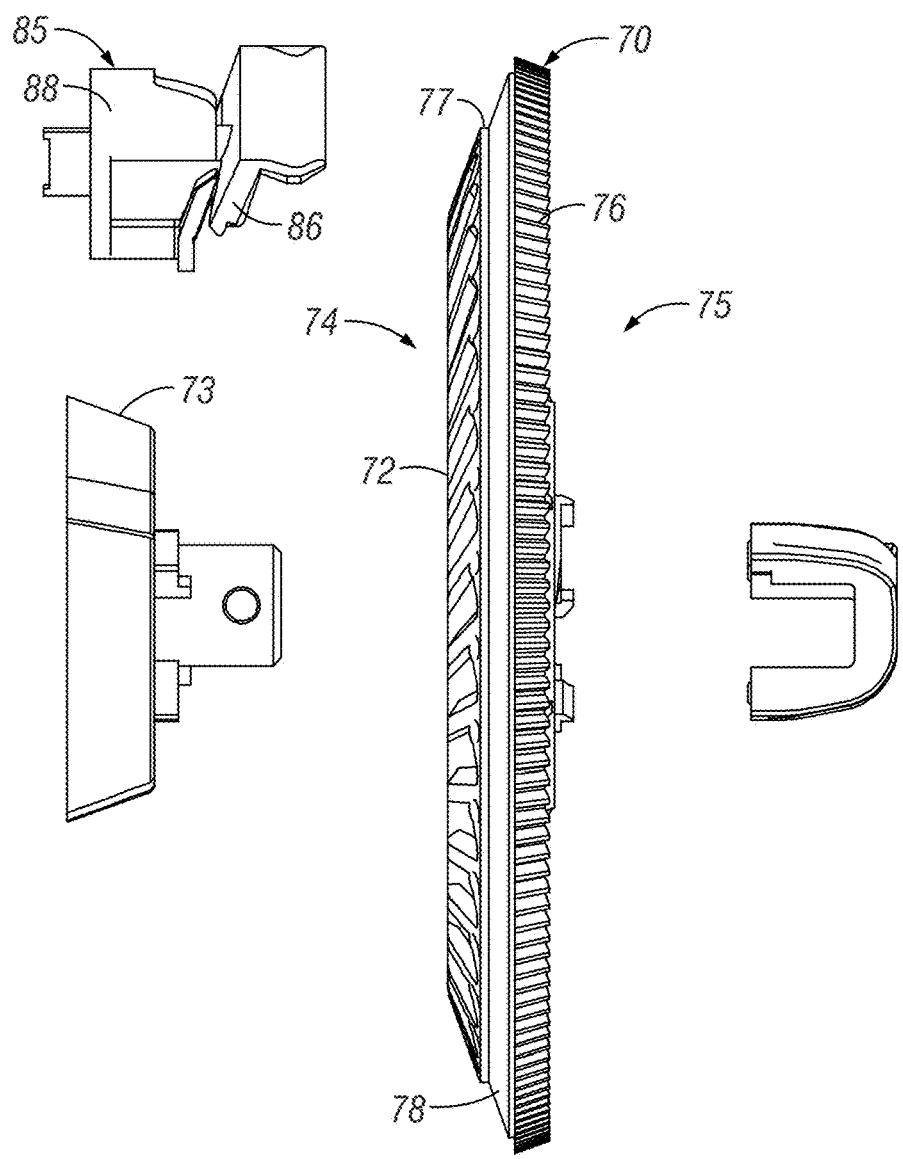
FIG. 21 is a side exploded view of the seed disk and singulator.
Figure 22:
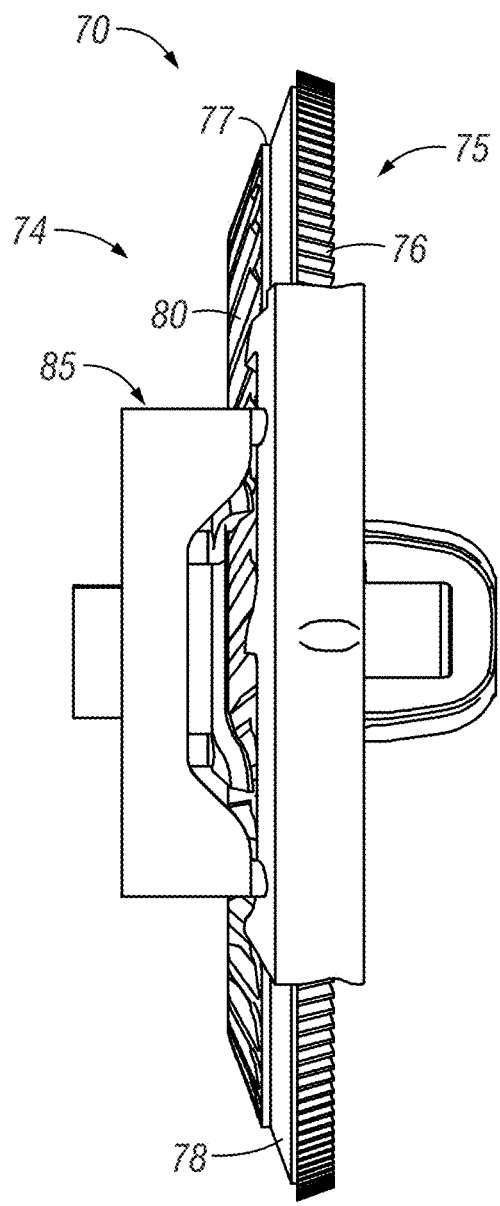
FIG. 22 is a top view of the seed disk and singulator.
Figure 23:
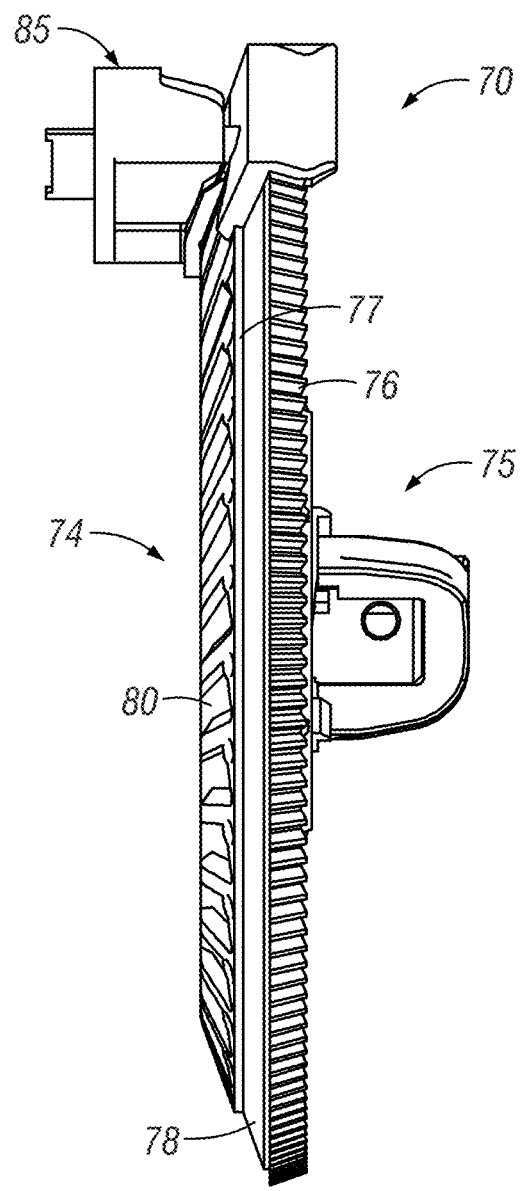
FIG. 23 is a side view of the seed disk and singulator.
Figure 24:
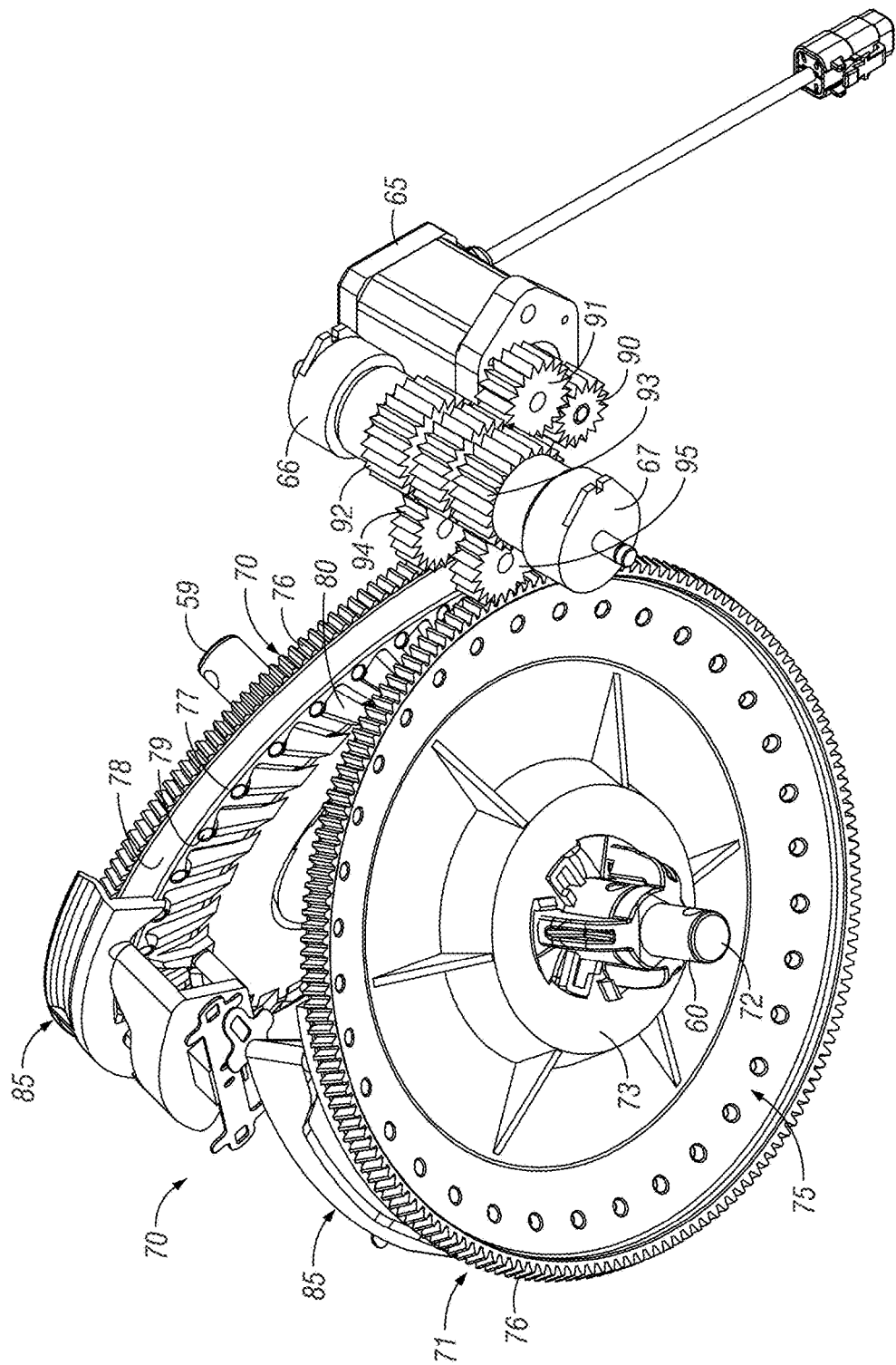
FIG. 24 is a perspective view of the seed disks and drive mechanism according to aspects of the disclosure.
Figure 25:
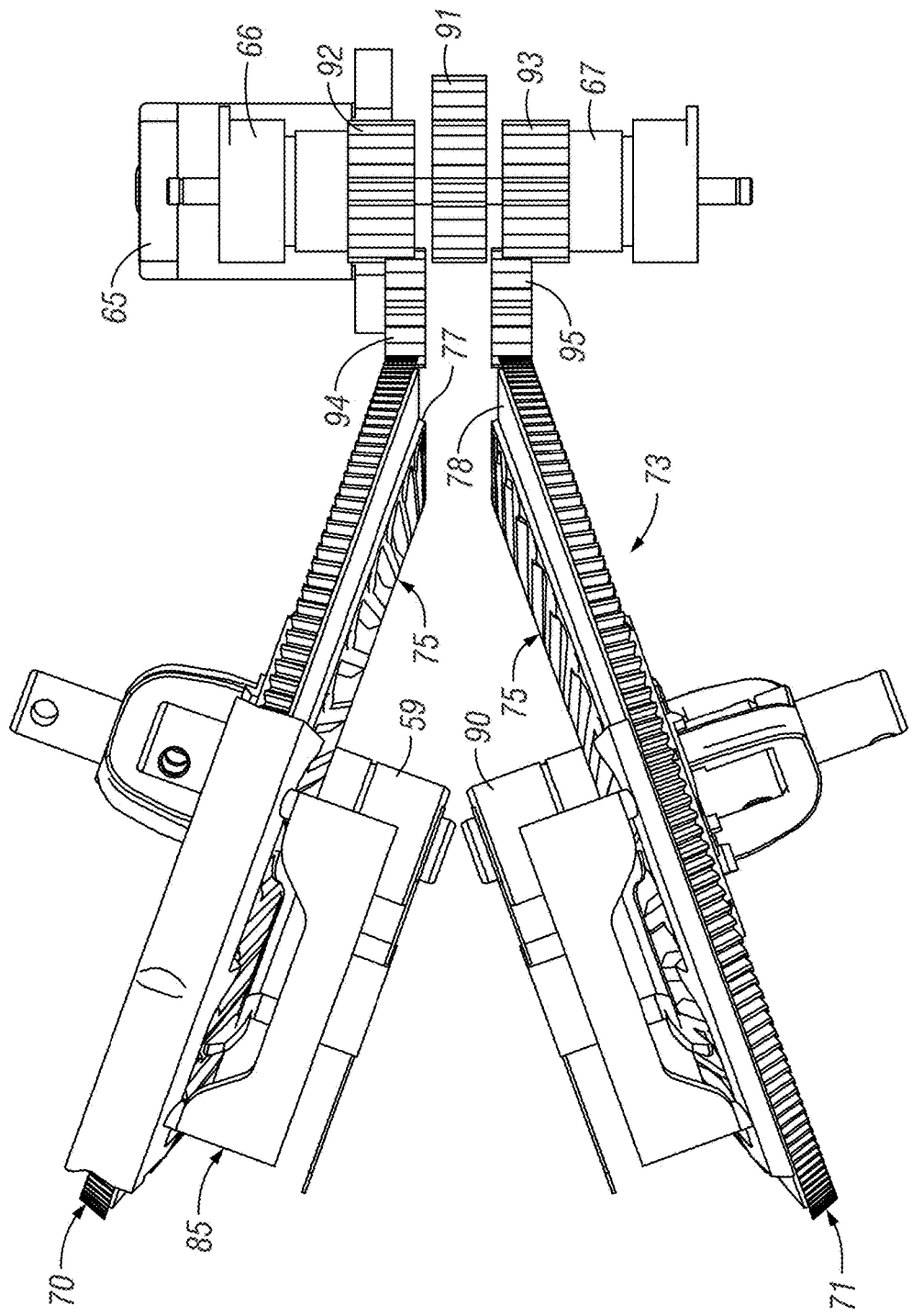
FIG. 25 is a top plan view of FIG. 24.
Figure 26:
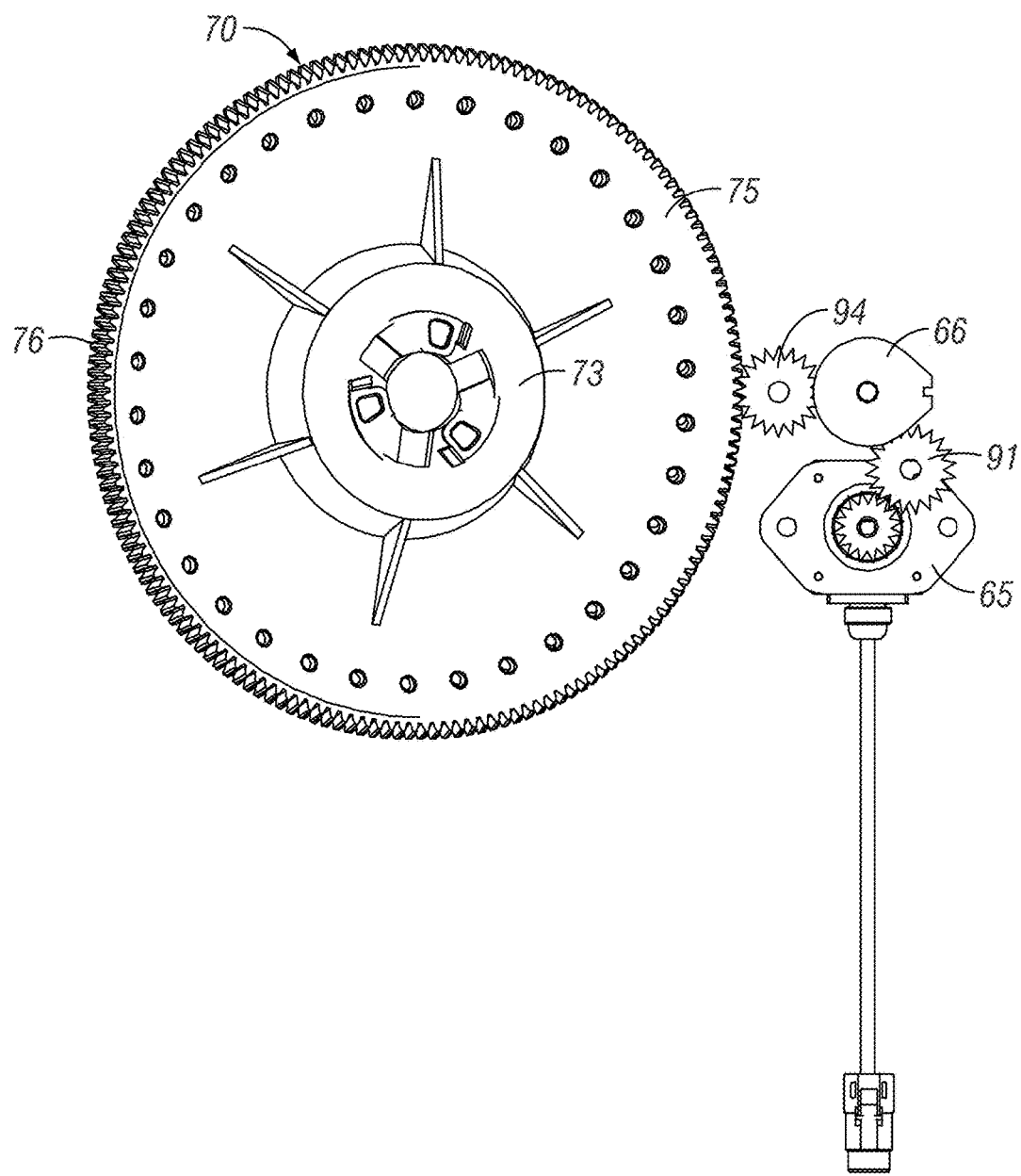
FIG. 26 is a side view of FIG. 24.
Figure 27:
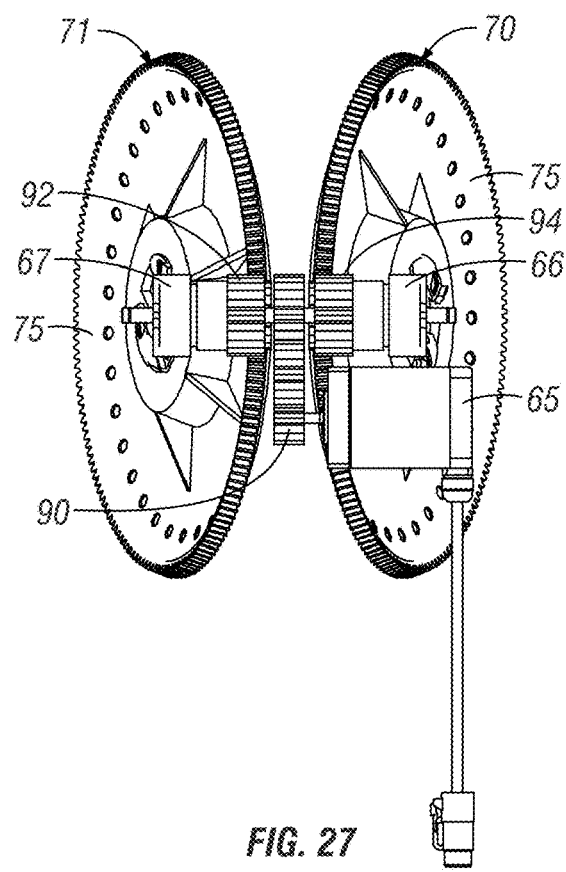
FIG. 27 is a front view of FIG. 24.
Figure 28:
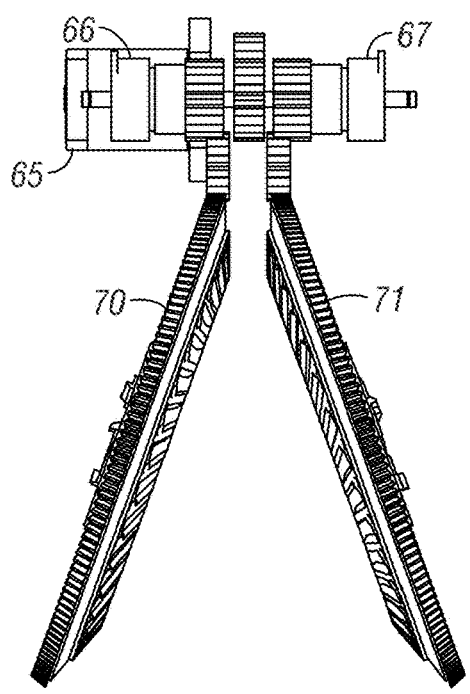
FIG. 28 is a top plan view of seed disks and a drive mechanism.

FIG. 16-23 show aspects of the seed disk and/or singulator according to aspects of the present disclosure. It should be appreciated that, while the figures show a single disk and singulator, the disks and singulators utilized on either portion or section of the seed meter 40 will be generally identical to one another and such, describing a single disk and singulator also describes the other that is utilized with the present disclosure. Therefore, as has been included as part of the disclosure, a seed disk 70 is provided. As is shown in the figures, the seed disk is a circular but conical shaped member. For example, FIGS. 17 and 18 show from a front or rear view the disk 70 will appear to be circular. However, as is shown in FIGS. 21-23, when viewed from the side, the disk will be conical in nature. As has been disclosed, the conical nature will allow for the disk to be angled relative to one another within the seed meter housing, while still allowing for a seed to be released at a generally vertically manner at the common seed release point.

Furthermore, the seed disk 70 includes a seed side 74 and an air side 75. The seed side 74 is the side or face of the cone which encounters and/or is attached to the seed within the seed meter. This is shown best in FIGS. 16 and 17. The air side 75 is the side that interacts with the pressure generator to provide the pressure differential at the seed cells 79 through the seed disk to encourage and hold the seed to attach at the seed cells. Furthermore, the seed disk includes a seed axis 72 and a hub 73. The hub is a mechanism which can attach to the bearings 59, 60 of the seed meter 40 to provide for easier rotation of the disk relative to the generally stationary seed meter housing 42. Thus, as is shown, the hub 73 which are located generally at the axis 72 of the disk 70 provide for connecting means to said bearing members.

Furthermore, the seed disk 70 includes a plurality of seed cells 79 radially positioned around the axis 72 of the seed disk 70. The seed cells 79 are apertures from one side of the disk to the other. The seed cells allow for the pressure differential to occur at the seed side base 74 of the seed disk 70 to encourage and hold seed at the cells. However, when the seed cells experience no pressure differential, such as when the holes on the air side 75 are not under a pressure at all, the seed can be released from said disk. This generally occurs at the location of the seed release point 55 which may be above the seed chute or other seed delivery mechanism. Furthermore, as is shown in the figures, the seed disk is conical shaped having a generally conical section including a plurality of seed channels 80. The seed channels 80 are channels or basins or recesses into the seed side surface of the seed disk 70. The seed channels are formed in a generally back swept orientation and include a front surface 82 and a rear surface 83. The front surface may be generally perpendicular or can be chamfered, while the rear surface can also be perpendicular or chamfered with respect to the axis 72 and with respect to the conical face of the seed side 74 of the seed disk 70. As is shown in the figures, the seed channels generally do not intersect the seed cell path, which is a path (not shown) that may connect each of the axes of the seed cell apertures. However, the disclosure also contemplates that the channels could intersect the seed path in some situations. The seed channels 80 can be used to agitate in the seed pools as the seed disk is rotated, and to encourage the seeds to move via the channels towards the seed cells, wherein the pressure differential will allow the seed to be held at the seed channel.

Furthermore, adjacent the seed cell path is a recessed lip, shoulder, or other false edge 77. Extending from the lip or shoulder 77 is a flange portion 78 extending towards an outer radius of the seed disk 70. This lip 77 and flange portion 78 create the illusion of a false edge to which the seed being held at the false edge of the disk. It has been shown that seed is best released at the edge of a seed disk. However, due to the configuration of the seed disk of the present disclosure, this may not always be possible. Therefore, the inclusion of the recessed lip or shoulder 77 and the extending flange therefrom 78 allows for the seed to act as if it were held at the edge of the seed disk 70. Once the seed is at a point of little or no pressure differential, the seed will drop from the disk as if it were dropped at the edge of the disk, and not at an interior portion therefrom. This is advantageous as it allows the seed to drop in a generally vertical manner from the seed disk and towards the ground.

Still further, the inclusion of the flange portion 78 allows for the outer radius of the seed disk 72 to include gear teeth 76 surrounding the outer radius thereof. As will be understood, the gear teeth can interact with the drive mechanism and/or clutch to allow for the drive and rotation of the disk.

Also shown in the figures is the singulating mechanism 85. The singulator or singulating mechanism 85 includes a portion with a non-planar surface 86 including one or more lobes 87 extending therefrom, as well as an attachment member 88. The attachment member is utilized to attach the singulator to the seed meter housing 42. The non-planar surface or blade 86 of the singulator 85 is configured to interact with the conical shape of the flange portion 78 and raised portion there near of the seed disk 70. For example, due to the conical shape of the seed disk, the curvature of the face of the disk will be in three dimensions. The dimensions include the rotation of travel as well as from the axis to the radius. The surface or blade 86 of the singulator 85 must also be radiused, curved, arced, or otherwise configured in more than one dimensions to account for the conical shape of the disk. Therefore, the face can still ride on the conical shape while being non-planar in nature.

The lobes 87 are also non-planar to allow for them to interact or be positioned near the seed cells 79 of the seed disk. The lobes are configured to knock off double seeds being held at a single cell such that only a single seed is held at a single cell. This will mitigate the possibility of doubles being planted, which can affect the yield of the crop being planted. Furthermore, the attachment member 88 can include a biasing member or non-biasing member wherein the biasing member can bias the non-planar blade 86 at or towards the seed side 74 of the seed disk. When a non-biasing member is utilized, the attachment member 88 can be sized such that it positions the blade 86 generally adjacent the seed side 74 of the seed disk.

Furthermore, the singulator could be fixed or adjustable to accommodate different particulate sizes, types, numbers and the like. An adjustable singulator that includes an adjustment mechanism that could be incorporated into the singulator of the present disclosure can be found in U.S. application Ser. No. 13/829,787, filed Mar. 14, 2013, which is herein incorporated by reference in its entirety.

Also shown is the air side 75 of the seed disk 70. The air side includes some structural components and also includes and aperture for the hub 73 to be positioned, wherein the hub can be connected to the bearing members to provide for reduced friction rotation of the seed disks within the seed meter housing. The air side 75 of the seed disk 70 can also provide for means to connect the seed disk to the seed meter housing such that it is held thereat and rotated therein.

FIGS. 24-28 show aspects of the driving mechanism in relation to the seed disk. The drive mechanism generally includes a single drive member, which is shown in the figures to be an electric motor 65. The electric motor 65 can be any type of motor, including but not limited to a brushless DC motor. However, this is not to be limiting to the invention or disclosure and generally any type of electric or non-electric drive member can be utilized and considered a part of the present disclosure. The motor 65 is operatively connected to a clutch mechanism which includes a first clutch 66 and a second clutch 67. The first clutch 66 is associated with a first disk 70, while the second clutch member 67 is associated with the rotation of the second seed disk 71. As has been disclosed, the first and second seed disks 70, 71 include an outer radius comprising gear teeth. These gear teeth can interact with gears of the clutches 66, 67 to selectively rotate one or both of said seed disks via the operative connection to the motor 65. Therefore, the system allows for only one of the two disks to be rotated at a single time, which will provide for the planting of only one of the seed type of varieties at a single time, both of the seed disks to be rotated at the same time, or having a portion wherein both are rotating with some overlap at the same time. For example, in preparation for the switching of one disk to the other, the non-in-use disk can be rotating to be at the necessary rotational velocity by the time the seeds are to be planted. At such a time, there may be an overlap in which both of the seed disks are both rotating at the same or different rotational velocities. In addition, it is contemplated that the clutch system allows for both disks to be engaged at the same time to allow for the same rotational velocity of the disks in unison or with different velocities such that the disks rotate in non-unison with one another. This would allow for a particulate such as refuge to be planted with or near the seed being planted. One disk could be used to plant a seed, while the other planting a different particulate.

The motor includes an outlet shaft which has a motor gear 90 position thereon. The rotation of the output shaft rotates the gear 90. This gear can interact with one or more idler gears 91 to provide the rotation of the clutch mechanism to rotate one of the motor gears 92, 93 via the clutch mechanism. The clutch mechanism can then activate one of the first or second clutches 66, 67 in which case a first clutch gear 92 or second clutch gear 93 will be rotated along with the clutch mechanism. Only one of the clutch gears 92, 93 will be rotated at a time and will be determined by which of the clutches is activated. The other clutch, not being activated, can set idly, which means that the corresponding gear of the clutch will also stand idly. For example, when the first disk 70 is to be activated, the first clutch 66 is activated to connect the first clutch gear 92 with the clutch mechanism, wherein the rotation from the motor will be provided to the clutch gear 92. This clutch gear can either be directly attached to the gear teeth 76 of the first disk 70 or can be connected operatively via an intermediate gear 94 such that the rotation of the gear is passed towards the disk 70. Thus, the first disk will rotate at a speed which can be changed via the motor 65 to provide for a rotational velocity to match a desirable planting rate. Furthermore, while the system can be connected to a central processing unit, control logic, intelligent control, or the like, disk speed can be varied, such as to compensate for turning and the location of the seed meter and row unit to which it is included. For example, when a planter rotates, the outer row units and thus, seed meters thereon will need to plant at a higher rate than the row units and seed meters positioned at the interior of the turn. Therefore, the invention contemplates and includes a system in which the seed meters can be operated at different rotational velocities to compensate for the turning of a planter.

Furthermore, as previously disclosed, the clutch could be activated such that there is overlap of the disks rotating, such that the disks rotate in substantial unison at the same or near same rotational velocities, or in an offset manner where both are rotating but with different velocities.

However, when it is determined, either by operator, prescription map, or some other factor, that the first disk is to be stopped and the seed associated with the second disk 71 is to be planted, the first clutch 66 can be quickly disengaged, while the second clutch 67 can be engaged to allow for the rotation of the clutch gear 93 associated with the second clutch 67. This clutch then receives the rotational velocity from the motor, and can transfer the same to the second disk via either direction connection to the gear teeth 76 thereon or via an intermediate gear 95 positioned between the second clutch gear 93 and the gear teeth 76 of the second disk 71. The system allows for gear instantaneous changing and control of the disk that is rotating, and thus the type of seed and/or hybrid of seed that is being planted via the seed meter system 40. Due to the motor or dry mechanism being electric, the speed can change, and the clutch can also be instantaneously activated and deactivated such that the rotation to the seed disk can be instantaneous to provide for near instantaneous changing of planting, such as from one seed to the next. This can happen on a seed by seed basis such that the changing of seed occurs within inches of one another.

As mentioned, the system including the drive system or drive mechanism can be connected to a processing unit, such as a CPU, tablet, phone, user interface, or any other computing device. The prescription map can be preloaded such that the computing unit automatically adjusts the seed being planted based upon the location of the planter, such as based upon the GPS coordinates of the planter or even seed meter as it moves through the field. This will provide for near instantaneous and on the fly changing of a seed type being planted via the seed meter to provide for the greatest or best chance of getting the highest yield of crop planted via the system.

Therefore, the seed meter has been shown and can be used as follows. Seed is provided to the multiple hoppers such that a first type of seed is included in one and a second type of seed is included in another hopper. The first seed type can be delivered to a first side of the seed meter 40 via an air seed delivery or other seed delivery method. The second seed type is delivered to the opposite side of the seed meter and is collected in the second pool. As a planter begins planting, a prescription map or other computer logic or even operator control, can determine which of the seeds is to be planted at a time. The disk associated with said seed type within the seed meter housing is activated to begin singulating and planting said seed type through the field. Once it is determined, via the computing system or operator, that the seed type is to be changed, the clutch system of the seed meter can deactivate and activate to switch to the control of the other seed disk within the seed meter housing 40 to be singulating and planting the seed associated with said other seed disk. This can continue in a back and forth manner and can be changed on the fly to plant the different seed varieties in a field to give the best chance for getting the highest yield of seed planted via the system.

Therefore, a seed meter and metering system for planting a plurality of seed types and/or hybrids has been shown and described here. It is to be contemplated that various alternatives and changes be provided such as the number of seed disks, the number of meters of a row unit, the angular displacement of the disk, the amount of curvature and/or conical shape of the disk, the type of dry mechanism, the number of clutches and type of clutches, as well as any other number of changes that may be contemplated or considered part of the disclosure. That which has been described as merely exemplary. The present disclosure contemplates numerous variations, options, and alternatives that fall within the spirit and scope of the disclosure.

What is claimed is:

1. A row unit for use with an agricultural planting implement, comprising:
   a seed meter comprising:
   a. a seed meter housing;
   b. a first seed disk and a second seed disk positioned in the seed meter housing such that the disks rotate in the same rotation direction and include a common seed release point;
   a single drive member operatively connected to both the first and second seed disks such that the drive member selectively rotates one or both of the first or second seed disks at a time;
   wherein the first and second disks each comprising a conical-shaped member with a central axis and comprising seed cells radially positioned about a convex portion and being substantially non-perpendicular to the central axis; and
   wherein seed at least temporarily positioned at the seed cells on the convex portion of the disks until release at the common seed release point.

2. The row unit of claim 1, wherein the seed meter housing comprises a wall separating the first disk and the second disk.

3. The row unit of claim 2, wherein the seed meter housing further defines a first seed pool collection area for storing seed associated with the first seed disk, and a second seed pool collection area for storing a different seed hybrid associated with the second seed disk.

4. The row unit of claim 1, further comprising a first clutch operatively positioned between the drive member and the first seed disk, and a second clutch operatively positioned between the drive member and second seed disk, the first and second clutches configured to provide the selective rotation to the disks.

5. The row unit of claim 1, further comprising a first singulator associated with the first seed disk for singulating seed positioned thereon, and a second singulator associated with the second disk for singulating seed positioned thereon.

6. The row unit of claim 5, wherein said first and second singulators comprise a substantially non-planar surface in communication with a seed side of the seed disks to singulate seeds at the seed cells.

7. The row unit of claim 1, wherein the seed disks further comprise a seed disk side and an air side, said seed disk side including backswept seed channels positioned adjacent the seed cells for directing seed from seed pools to the cells.

8. The row unit of claim 1, wherein said first and second seed disks are angularly positioned relative to one another such that the disks have axes of rotation that are not substantially perpendicular to the direction of travel of the agricultural planting implement.

9. The row unit of claim 1, further comprising first and second seed inlets, said first seed inlet associated with the first seed disk side of the interior of the seed meter housing, and said second seed inlet associated with the second seed disk side of the interior of the seed meter housing.

10. The row unit of claim 1, wherein the seed meter housing further comprises a single air delivery inlet that provides an air pressure differential to both the first and second seed disks within the seed meter housing.

11. The row unit of claim 10, wherein the air pressure differential is a negative pressure.

12. The row unit of claim 1, wherein the seed meter housing further comprises a seed chute that directs seed from both the first and second seed disks towards a furrow in the ground.

13. The row unit of claim 1, wherein the seed meter further comprises first and second bearings operatively connected to the first and second seed disks to allow for easier rotation of the disks.

14. The row unit of claim 13, wherein the first and second bearings pass substantially through a central axis of the first and second disks.

15. The row unit of claim 1, wherein the drive member is an electric drive motor.

16. The row unit of claim 1, wherein the drive member is a mechanically-driven shaft.

17. The row unit of claim 10, wherein air pressure differential is a positive pressure.

18. A seed meter, comprising:
a seed meter housing;
a first seed disk and a second seed disk positioned in the seed meter housing such that the disks rotate in the same rotation direction and include a common seed release point;
wherein the first and second disks each comprising a conical-shaped member with a central axis and comprising seed cells radially positioned about an outer portion and being substantially non-perpendicular to the central axis; and
a single drive member operatively connected to both the first and second seed disks such that the drive member selectively rotates one or both of the first or second seed disks at a time;
wherein the seed meter housing further comprises a single air delivery inlet that provides an air pressure differential to both the first and second seed disks within the seed meter housing.

19. A row unit for use with an agricultural planting implement, comprising:
a seed meter comprising:
   a. a seed meter housing;
   b. a first seed disk and a second seed disk positioned in the seed meter housing such that the disks rotate in the same rotation direction and include a common seed release point;
a single drive member operatively connected to both the first and second seed disks such that the drive member selectively rotates one or both of the first or second seed disks at a time; and
wherein the seed meter housing further comprises a single air delivery inlet that provides an air pressure differential to both the first and second seed disks within the seed meter housing.

* * * * *